United States Patent
Meier et al.

(10) Patent No.: US 7,561,549 B2
(45) Date of Patent: Jul. 14, 2009

(54) WIRELESS LOCAL AREA NETWORK CONTEXT CONTROL PROTOCOL

(75) Inventors: Robert Meier, Cuyahoga Falls, OH (US); Richard D. Rebo, Fairlawn, OH (US); Victor J. Griswold, North Canton, OH (US); Douglas Smith, Stouffvile (CA); Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 773 days.

(21) Appl. No.: 11/121,633

(22) Filed: May 4, 2005

(65) Prior Publication Data

US 2005/0220054 A1    Oct. 6, 2005

Related U.S. Application Data

(63) Continuation of application No. 10/417,653, filed on Apr. 17, 2003.
(60) Provisional application No. 60/429,714, filed on Nov. 26, 2002, provisional application No. 60/439,419, filed on Jan. 10, 2003.

(51) Int. Cl.
*H04Q 7/00* (2006.01)
*H04Q 7/24* (2006.01)
*G06F 7/00* (2006.01)
*G06F 15/177* (2006.01)

(52) U.S. Cl. ............... 370/331; 370/338; 707/104.1; 709/220

(58) Field of Classification Search ........... 370/331, 370/338, 60; 455/33.1; 380/271, 278; 709/216, 709/241, 200; 707/200, 100, 104.1
See application file for complete search history.

(56) References Cited

U.S. PATENT DOCUMENTS

| 5,504,746 | A |   | 4/1996 | Meier |
| 5,539,922 | A | * | 7/1996 | Wang ................ 455/456.2 |
| 6,078,575 | A | * | 6/2000 | Dommety et al. .......... 370/338 |
| 6,167,438 | A | * | 12/2000 | Yates et al. ................ 709/216 |
| 6,259,791 | B1 | * | 7/2001 | Moore ..................... 380/271 |
| 6,701,361 | B1 |   | 3/2004 | Meier |

(Continued)

OTHER PUBLICATIONS

U.S. Appl. No. 10/041,005, filed Jan. 7, 2002, Halasz et al.

*Primary Examiner*—Charles N Appiah
*Assistant Examiner*—Kiet Doan
(74) *Attorney, Agent, or Firm*—Tucker Ellis & West LLP

(57) ABSTRACT

A Wireless LAN Context Control Protocol (WLCCP) is used to establish and manage a wireless network topology and securely manages the "operational context" for mobile stations in a campus network. The WLCCP registration protocol can automatically create and delete links in the network, securely distribute operational context, and reliably establish Layer 2 forwarding paths on wireless links. A single infrastructure node is established as the central control point for each subnet, and enables APs and MNs to select the parent node that provides the "least-cost path" to a backbone LAN. Context messages provide a general-purpose transport for context and management information. WLCCP "Trace" messages facilitate network diagnostic tools. Ethernet or UDP/IP encapsulation can be used for WLCCP messages. Ethernet encapsulation is employed for intra-subnet (e.g. AP-to-AP or AP-to-SCM) WLCCP messages. IP encapsulation is used for inter-subnet WLCCP messages and may also be used for intra-subnet WLCCP messages.

59 Claims, 17 Drawing Sheets

U.S. PATENT DOCUMENTS

| | | | |
|---|---|---|---|
| 7,007,040 B1 * | 2/2006 | Duke et al. | 707/200 |
| 7,043,024 B1 * | 5/2006 | Dinsmore et al. | 380/278 |
| 7,082,473 B2 * | 7/2006 | Breitbart et al. | 709/241 |

* cited by examiner

| Field Name | Offset | Size (bytes) | Description |
|---|---|---|---|
| Node Type 1802 | 0 | 2 | (none) = 0<br>AP = 1<br>SCM = 2<br>LCM = 4<br>CCM = 8<br>ICN = 0X10 /* infrastructure */<br>Client = 0X40<br><br>Multicast Flag—0X8000 |
| Node Address 1804 | 2 | 6 | IEEE 48-bit global or locally administered address in canonical (i.e. Ethernet) format. |
*Fig. 2*
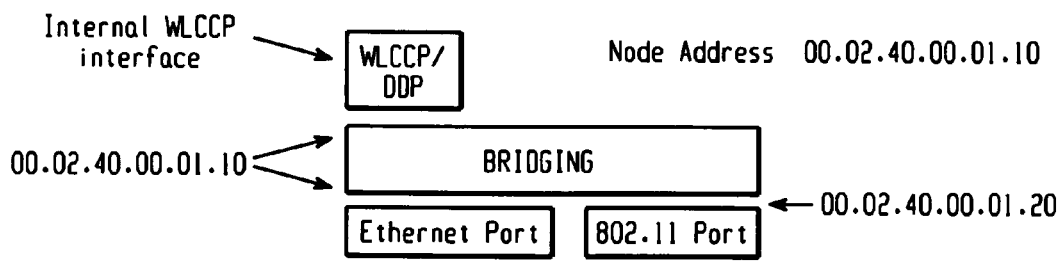
*Fig. 3*
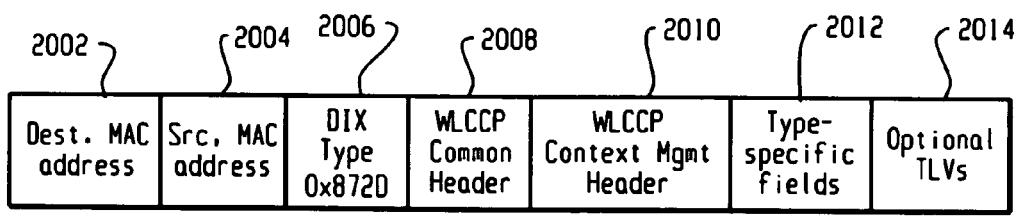
*Fig. 4*

| Field Name | Offset | Size (bytes) | Description |
|---|---|---|---|
| Protocol ID/Version | 0 | 1 | Hex. C1-selected for compatibility with DDP. |
| WLCCP SAP | 1 | 1 | 8-bit protocol service access point ID 0=WLCCP Context Mgmt SAP 2=Radio Resource Mgmt SAP |
| Dest. Node Type | 2 | 2 | Node type of the hop destination |
| Length | 4 | 2 | Length of the message in bytes, including the WLCCP header |
| Type | 6 | 1 | Message Type Bits 0-1—Subtype (0=Request, 1=Reply, 2=Confirm, 3=Ack) Bits 2-7—Base Message Type |
| Hop Count | 7 | 1 | Number of WLCCP hops |
| Message ID | 8 | 2 | Message sequence number used to match request/reply pairs. |
| Flags | 10 | 2 | Bit 0—Retry flag (set ON in retransmissions) Bit 1—Response-Req flag (set ON to request a reply) Bit 2—TLV flag (set ON to indicate that optional TLVs follow the fixed fields) Bit 3—Inbound Flag Bit 4—Outbound Flag Bit 5—Hopwise-Routing Flag Bit 6—Root CM Flag Bit 7—Relay Flag Bit 8—MIC Flag Bits 9-15—(reserved-must be 0) |
| Originator Node ID | 12 | 8 | Originator Node Type and Node Address |
| Responder Node ID | 20 | 8 | Responder Node Type and Node Address |
| Data | 28 | N | Type-specific fields and TLVs |

Fig. 5

WIRELESS LOCAL AREA NETWORK CONTEXT CONTROL PROTOCOL

CROSS-REFERENCE TO RELATED APPLICATIONS

This application is a continuation of U.S. application Ser. No. 10/417,653 filed on Apr. 17, 2003, which claims the benefit of priority of U.S. Provisional Application No. 60/429,714 filed Nov. 26, 2002 and U.S. Provisional Application No. 60/439,419 filed on Jan. 10, 2003, which are hereby incorporated by reference herein.

COPYRIGHT OR MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to wireless networks and more specifically to a hierarchical architecture for wireless networks.

In large campus or metropolitan networks, a "distributed" context transfer protocol can be used to directly transfer context from an "old AP" to a "new AP", when a MN roams. The IEEE 802.11f draft protocol, for example, defines a distributed context transfer protocol. However, there are a number of inherent problems with such a distributed approach. A secure context transfer requires a many-to-many trust relationship between APs (or requires some additional hierarchy). In addition, a protocol is needed to enable the "new AP" to determine the "old AP" when a MN roams, the "old AP" 802.11 Reassociation field is not sufficient. Context is passed around from AP to AP as a station roams; therefore, critical context may be lost (e.g. if the link to an old AP is lost). Furthermore, a distributed protocol is susceptible to an inherent race condition where "handoff messages" for rapidly roaming stations may arrive out-of-order.

Thus, a need exists for a network protocol and topology that is capable of supporting a large number of infrastructure nodes that enables mobile nodes to roam seamlessly within a single subnet or between a plurality of subnets in a campus network. The path between each mobile node and correspondent host (CH) should be reliably re-established when the mobile node roams. Because the campus network may include a large population of stations that roam frequently, the overhead for roaming should be minimal.

BRIEF SUMMARY OF THE INVENTION

A Wireless LAN Context Control Protocol (WLCCP) is used to establish and manage a wireless network topology and securely manages the "operational context" for mobile stations and/or infrastructure nodes in a network. The WLCCP registration protocol can automatically create and delete links in the network, securely distribute operational context, and reliably establish Layer 2 forwarding paths on wireless links. A single infrastructure node is established as the central control point for each subnet, and enables APs and MNs to select the parent node that provides the "least-cost path" to a backbone LAN. Context messages provide a general-purpose transport for context and management information. WLCCP "Trace" messages facilitate network diagnostic tools. Ethernet or UDP/IP encapsulation can be used for WLCCP messages. Ethernet encapsulation is employed for intra-subnet (e.g. AP-to-AP or AP-to-SCM) WLCCP messages. IP encapsulation is used for inter-subnet WLCCP messages and may also be used for intra-subnet WLCCP messages.

An aspect of the present invention is that it supports fast, secure context transfer without introducing a need for many-to-many security relationships between access points. WLCCP secure context transfer and message authentication is independent of the underlying security infrastructure. WLCCP enables infrastructure nodes to mutually authenticate and establish secret session keys.

An aspect of the present invention is that it enables a node at the root of a subnet to cache context information for descendant nodes in the subnet tree. The descendant nodes can either be infrastructure nodes, mobile nodes, mobile nodes coupled to infrastructure nodes or any combination thereof.

An aspect of the present invention is that bindings can be aged and discarded. For example, if a mobile node becomes inactive, its bindings can be discarded and when the mobile node becomes active again, new bindings can based on the mobile node's current context can be provided.

Although WLCCP does not perform mobile node authentication, it facilitates fast re-authentication by securely transferring dynamic mobile node security credentials.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

FIG. 2 is a table illustrating the format of a WLCCP Node ID.

FIG. 3 is block diagram showing the internal bridging structure in an access point.

FIG. 4 is an example of an Ethernet-encapsulated WLCCP Context Management frame.

FIG. 5 is an example of a WLCCP Message Header.

DETAILED DESCRIPTION OF INVENTION

Figure 1:
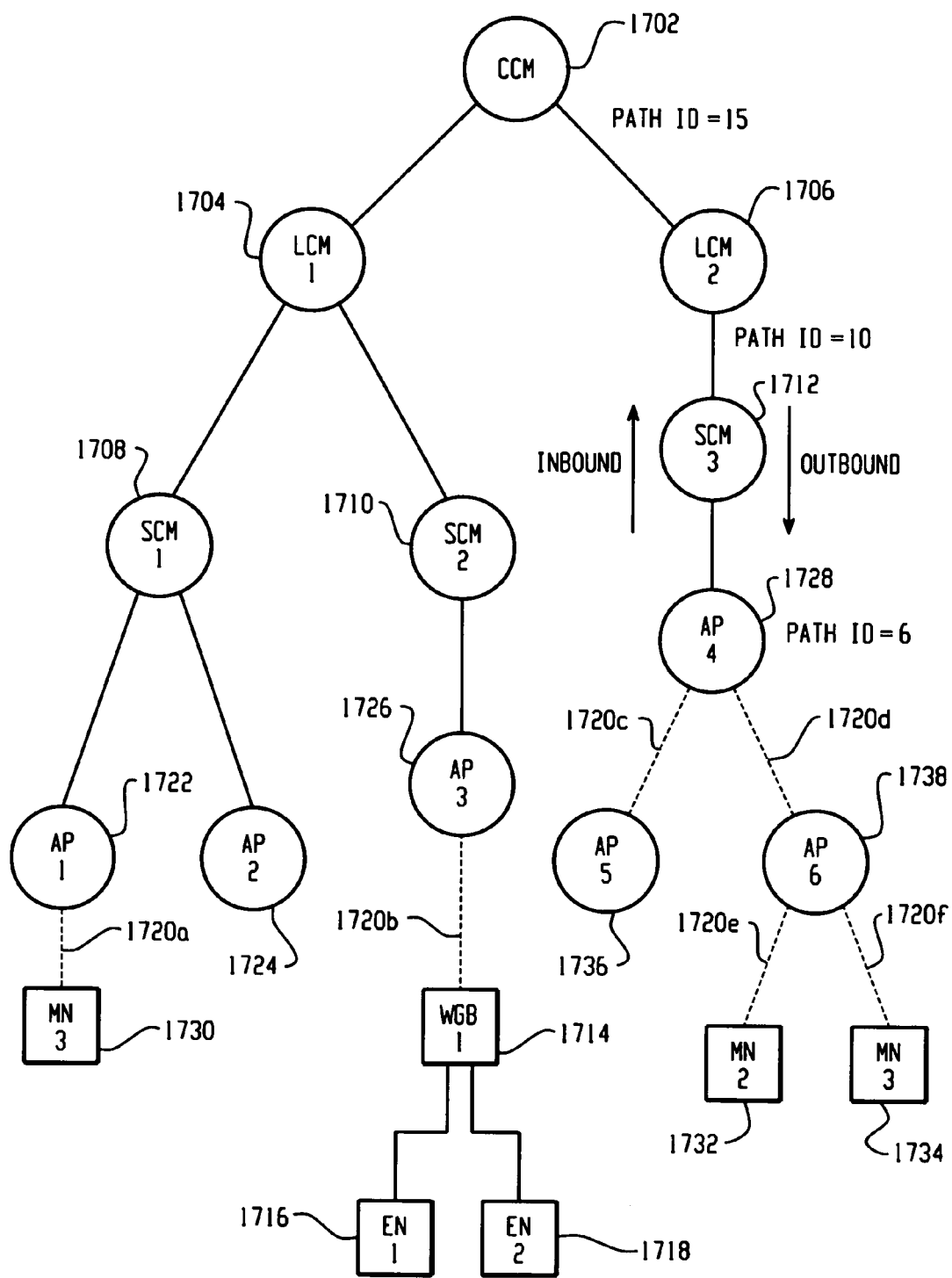
FIG. 1 is a block diagram of an exemplary network topology tree.

Throughout this description, the preferred embodiment and examples shown should be considered as exemplars, rather than limitations, of the present invention.

An aspect of the present invention is a Wireless LAN Context Control Protocol (WLCCP) that is used to establish and manage a network topology, referred to herein as the Smart Wireless Architecture for Networking (SWAN), although this aspect is capable of being implemented with any type of network utilizing roaming (e.g., mobile) nodes. WLCCP is used to securely manage the "operational context" for mobile stations in a campus network, such as SWAN.

The WLCCP registration protocol automatically creates and deletes links in the SWAN topology, securely distributes operational context, and (optionally) reliably establishes Layer 2 forwarding paths on wireless links. WLCCP "Context" messages provide a general-purpose transport for context and management information. WLCCP "Trace" messages facilitate network diagnostic tools.

A WLCCP SCM (Subnet Context Manager, a node which manages a subnet, which may also be known as a wireless domain server) advertisement/election protocol automatically establishes a single node (e.g., SCM) as the central control point for each subnet, and enables APs and MNs to select the parent node that provides the "least-cost path" to a backbone LAN.

WLCCP is a transaction-oriented "request/reply" protocol. WLCCP request and reply messages preferably have a fixed-length header that contains message-type-dependent fields. Optional Type-Length-Value pairs follow the fixed length header; thereby making WLCCP extensible.

Ethernet or UDP/IP encapsulation can be used for WLCCP messages. Ethernet encapsulation preferably is restricted to intra-subnet (e.g. AP-to-AP or AP-to-SCM) WLCCP messages. IP encapsulation is used for inter-subnet WLCCP messages and may also be used for intra-subnet WLCCP messages.

As those skilled in the art can readily appreciate, a specific WLCCP implementation may not include all of the components described herein. The architecture is scalable, thus the number of levels of the hierarchy can be adjusted to conform to the size of the network.

The network topology disclosed herein is organized as a hierarchical "Topology Tree". When a station roams from an "old AP" to a "new AP", context is generally transferred via the "nearest common ancestor", in the Topology Tree, of both the old and new APs. WLCCP registration includes the necessary routing logic to automatically find the nearest common ancestor. Cached configuration and context information is stored in the network infrastructure. The common ancestor securely forwards the cached information on the new Topology Tree branch for a station that has roamed. Therefore, context transfer is automatically "localized" and context information is not lost if the link to an old AP is lost. The common ancestor also forwards the "old AP bindings" to the new AP.

A many-to-many security relationship between 802.11 APs is not needed for secure context transfer. Instead, a trust hierarchy is established that corresponds to the Topology Tree. Operational context is generally forwarded on Topology Tree branches; therefore, WLCCP context transfer keys are pre-established between all SWAN nodes on the same topology tree branch (e.g., subnet). If it necessary to transfer context "laterally" between 2 nodes on different topology tree branches, then the nearest common ancestor of the 2 nodes can function as a trusted third party to quickly establish mutual authentication and a transient context transfer key.

The hierarchical Topology Tree facilitates central management and control points. For example, network-wide parameters can be centrally configured and distributed. A central WLCCP control point establishes and deletes topology links; therefore, it is possible to maintain a consistent network topology even if hand-off messages for rapidly roaming stations arrive out-of-order.

A locally or globally administered 48-bit IEEE 802 address is used as an internal WLCCP network Node Address. An IP address is not used as a Node Address because a node may change its IP address and WLCCP is used to manage Layer 2 mobility; it should generally be independent of any network layer protocol.

A WLCCP Node Address is an internal WLCCP node identifier and is preferably not used to identify APs and CMs to users in network management applications. Instead, a Network Access Identifier (NAI) or domain name can be used as a user WLCCP node identifier.

As used herein, a SWAN network is a "tree topology" rooted at a SWAN CM (Context Manger). WLCCP is used to establish and maintain the Topology Tree. An example Topology Tree for a full WLCCP implementation is shown in FIG. 1. FIG. 1 illustrates a "campus topology" with two local control domains (LCM) 1706 and 1706 and three subnet control domains (SCM) 1708, 1710 and 1712. The example network includes a Work-group Bridge (WGB-1) 1714 and its attached Ethernet Nodes (EN-1 and EN-2, 1716 and 1718 respectively). Topology branches that exist over 802.11 links are shown as dashed lines 1720a-f.

SWAN CMs and APs are interior nodes (INs) and MNs and secondary Ethernet Nodes (ENs) are leaves in the SWAN Topology Tree. The SWAN CCM 1702 is at the root of the campus Topology Tree. The CCM 1702 is the root CM, in a campus network. An LCM 1704, 1706 is at the root of the sub tree contained in a Local Control Domain. An SCM 1708, 1710, 1712 is at the root of the sub tree contained in each network subnet. A "parent AP" 1722, 1724, 1726 and 1728 is at the root of a sub tree that contains child MNs 1730, 1732 and 1734 and any child Aps 1736 and 1738.

The format of a WLCCP Node ID is shown in table 1800 of FIG. 2. A 64-bit WLCCP Node ID identifies each node in a SWAN network. A Node ID is a concatenated 16-bit WLCCP Node Type 1802 and a 48-bit WLCCP Node Address 1804. The Node Address 1804 for a MN, EN, AP, or SCM is a global 48-bit IEEE 802 address. The Node Address 1804 for an LCM or CCM can be a global or locally-administered 48-bit IEEE 802 address. It is contemplated in one embodiment, the CCM can automatically assign "local" 48-bit addresses to itself and other LCMs. A Node Address of 'all zeros' is used to identify the "local WLCCP node" in a WLCCP CM or AP. The Node Type is CCM, LCM, SCM, AP, MN, or EN.

Each physical AP (e.g. Ethernet and 802.11) communications interface is identified by a 48-bit IEEE 802 port address. An SCM's LAN communications interface is also identified by a 48-bit IEEE 802 port address. An 802 port address can be re-used as the WLCCP Node Address. Each WLCCP CM has an IP communications interface, which is identified by an IP port address. An IP port address is not used for the CM node address because a CM's IP address may change.

AP communications interfaces generally operate in "promiscuous mode"; therefore, an AP can receive WLCCP frames destined to its Node Address on any physical interface. In a simple implementation, the AP Node Address can be used to identify an "internal WLCCP interface" in an AP. FIG. 3 shows the internal bridging structure in an AP. The Ethernet 802 port address is also the WLCCP Node Address. A frame, which is destined to the Node Address and received on either the Ethernet or 802.11 interface, is "bridged" internally to the WLCCP protocol interface; therefore, the Node Address can also be used as the WLCCP "Hop Address" on any AP port. [WLCCP and DDP are shown together because they share the same Ethernet DIX type.]

Each WLCCP AP and CM should be configured with a permanent "node name" [e.g. Network Access Identifier (NAI) or a DNS domain name]. An LCM or is configured with a node name to request a locally administered Node Address from the CCM.

A Node ID is NOT a permanent node identifier and should not be used as such. An NAI can be used to represent network nodes to users. An Instance Identifier and its Node ID identify each "instance" of an "Attached" AP or CM. In WLCCP, an Instance Age is used as the instance identifier, as described herein below. Each WLCCP CM maintains cross-referenced tables that are used to map a WLCCP Node ID to a node name or IP address, or vice-versa.

Referring again to FIG. 1, in a campus network, each SWAN AP 1722, 1724, 1726, and 1728 CM 1704, 1706, 1708, 1710, 1712 other than the SWAN CCM 1702, is bound to a single "parent node" and to a single "parent CM". The parent CM for an LCM is the CCM. The parent CM for an SCM is an LCM. [Note that a single device may include multiple logical CMs. The device that contains the CCM always contains a logical LCM.] In FIG. 1, the parent node and parent CM, for AP 1720, are AP 1728 and SCM 1712, respectively.

The SCM for each subnet is the parent CM for all APs on its subnet and for all MNs that are associated with those APs. Note that a MN is a child of the SCM for the parent AP's "native" subnet even if the MN is bound to a different "home subnet" via VLAN trunking or Proxy MIP tunneling. For example, SCM 1708, AP 1722 and AP 1724 all belong to the same subnet. MN 1730 is a child of AP 1722; therefore, it is a child of SCM 1708. However, MN 1730 may belong to a different subnet if AP-1 is attached on a VLAN trunk link.

The "parent node" for an LCM or SCM is the parent CM. The parent node for a MN is the 802.11 parent AP. The parent node for a "root AP" is an SCM. The parent node for a non-root AP is the 802.11 parent AP. A node is considered a "child" of its parent. A "neighbor" is a parent or child node.

A logical "link" exists between a node and each of its neighbors. A "port" is the logical entity that provides access to a link. Each CM and AP has a single is primary port and one or more secondary ports. A node attaches to the network on its primary port. Multiple logical ports may exist on top of a single physical communications interface. For example, AP 1728 may use the same physical 802.11 interface to access the link to AP 1736 and AP 1738; however, AP 1728 has a separate logical port for each link.

A "branch" of the Topology Tree is comprised of a set of nodes and links that provide the shortest path between an "ancestor" node and a "descendant" node. An inbound node is an ancestor and an outbound node is a descendant. All nodes are descendants of the root CM 1702. An outbound path originates from an ancestor node and terminates at a descendant node. An inbound path originates at a descendant node.

A Topology Tree "link" exists between each SWAN node and each of its neighbors. A link is established when a "child node" selects a "parent node" and registers with the SWAN infrastructure via its parent node. An SCM-to-AP link is preferably an Ethernet link. An AP-to-AP link can be an Ethernet or 802.11 link. An AP-to-MN link is an 802.11 link. A CM-to-CM link can, conceptually, be any link that supports IP.

A node is responsible for maintaining the "link state" for each of its neighbors. An active link is in a "connected" state. A link transitions to a "disconnected" state if the underlying physical communications link is lost or if a child roams to a different parent node. A node must be able to detect link state changes in its neighbors; otherwise, links may exist in a "half-connected" state. AP-to-AP 802.11 link state is transparent to WLCCP implementations where WLCCP is not used for Layer 2 path updates.

The CCM's IP address or domain name must be statically configured in each LCM and in each SCM candidate. It is contemplated that in one embodiment an LCM or SCM can automatically discover the CCM, via a CCM Advertisement Protocol.

The list of subnets that are bound to each LCM is configured in the CCM. An SCM sends a request message to the CCM, initially and whenever any parent LCM is lost, to obtain its parent LCM assignment.

An SCM is automatically elected for each subnet. An AP automatically discovers its parent SCM, via an SCM Advertisement Protocol. A non-root "child AP" is also bound to a "parent AP", as described below. A MN is bound to a parent AP via the 802.11 association protocol.

A node is either in an "Attached" or "Unattached" state. A node is initially in the Unattached state. A CCM candidate transitions to the Attached state when it becomes the active CCM. A CCM transitions to the Unattached state when it relinquishes the CCM role. A non-CCM node transitions to the Attached state when it initially registers with the SWAN infrastructure. An Attached non-CCM node transitions to the Unattached state if it detects that is parent node is unattached, or it is unable to communicate with its parent node.

Each CM must maintain an internal Instance Age that contains the elapsed time, in seconds, since the node last transitioned to the Attached state. The Instance Age is initialized to 0 and is reset to 0 each time the node initially registers with a new parent CM. The Instance Age of an SCM is copied into the Instance Age field in SCM-Advertisement Reply messages, so that a child AP can detect a new instance of its parent SCM. A child AP becomes Unattached if it receives an advertisement message with a lower Instance Age. In one embodiment, an AP does not need to maintain an Instance Age if WLCCP is not used for Layer 2 path updates.

A SWAN network generally operates in "campus infrastructure mode" with a single CCM and corresponding Campus Control Domain. An LCM and its corresponding Local Control Domain must operate in "local stand-alone mode" if the LCM cannot communicate with the CCM. An LCM must also operate in stand-alone mode if it is not assigned to a CCM. Likewise, each SCM and corresponding subnet must operate in "subnet stand-alone mode", if the SCM is not assigned to a parent LCM.

In stand-alone mode, a Local Control Domain or Subnet Control Domain operates much like a SWAN campus network. An LCM operating in local stand-alone mode assumes CCM functions. The LCM or SCM at the root of a stand-alone domain functions as the 802.1X authenticator for both infrastructure nodes and MNs. A Local or Subnet Control Domain must be able to transition smoothly between infrastructure mode and stand-alone mode.

An LCM is configured with the IP address of the CCM, to operate in infrastructure mode. If an LCM is operating in stand-alone mode because it lost the link to its assigned CCM, then it must periodically attempt to re-establish communications with the CCM.

An SCM is configured with the IP address or domain name of the CCM, to operate in infrastructure mode. The CCM is responsible for assigning each SCM to an LCM. An AP must operate in a fallback "distributed mode" if it cannot discover an SCM for its subnet. An AP must be able to transition smoothly between infrastructure mode and distributed mode. For example, an AP can use the existing Cisco Datagram Delivery Protocol in distributed mode. Note that a user can force APs to operate in distributed mode by simply not configuring any SCM candidates.

In general, an LCM or SCM can transition smoothly from infrastructure mode to stand-alone (i.e. when the link to its parent is lost) mode without disconnecting nodes in its sub tree. Nodes in a "new" stand-alone domain can continue to use existing registration information and security credentials, which were previously established in infrastructure mode.

The sub tree rooted at an LCM or SCM must be rebuilt when the LCM or SCM transitions from stand-alone mode to infrastructure mode. An SCM or LCM establishes a new Instance ID when it transitions from stand-alone to infrastructure mode. An SCM also establishes a new Instance ID if its parent LCM changes. The sub tree rooted at the SCM or LCM is automatically deleted as nodes in the sub tree detect the new SCM or LCM instance.

WLCCP "Context Management" message types are listed below. A "request" and "reply" subtype is defined for each message type. An optional "confirm" and "ack" subtype is defined for select message types that require additional handshaking. The WLCCP message types comprise: SCM-Advertisement, CCM-Advertisement, Registration, Preregistration, Deregistration, Detach, Context, Path-Update, Path-Check, Trace, AAA and Path-Init.

A "Response-Req" Flag is set ON in a Request message to solicit a Reply message. In general, a reply message is used to acknowledge a request message and to return status and/or context information to the Originator. A request "message identifier" is copied into the corresponding reply message to "match" request/reply pairs. The same message identifier is used in retransmitted request messages, to identify all request/reply messages that belong to a single transaction.

An optional "Confirm" message can be used to acknowledge a Reply message and return status and/or context information to the Responder. The Response-Req Flag is set ON in a Reply message to solicit a Confirm message.

An optional "Ack" message can be used to acknowledge a Confirm message and return status and/or context information to the Originator. The Response-Req Flag is set ON in a Confirm message to solicit an Ack message.

WLCCP messages contained a fixed-length header, followed by optional, variable-length TLVs.

An SCM sends periodic SCM-Advertisement-Reply messages to advertise network parameters and availability and to facilitate the SCM election protocol, on each AP "native" subnet. APs automatically discover the active SCM for the local subnet by monitoring SCM advertisements. APs receive SCM advertisements on a "primary port" and forward SCM advertisements on "secondary ports" to propagate SCM and subnet information to descendent nodes in the SWAN topology.

A node can send an SCM-Advertisement-Request message to solicit an SCM-Advertisement-Reply message (e.g. to shorten the discovery period).

A CCM can, optionally, send periodic CCM-Advertisement-Reply messages to advertise network parameters and availability and to facilitate a CCM election protocol. LCMs and SCMs can automatically discover the active CCM by monitoring CCM advertisements. CCM-Advertisement Request and Reply messages are sent to an IP multicast address.

A node can send a CCM-Advertisement-Request message to solicit a CCM-Advertisement-Reply message.

A Registration-Request message is used to request registration for a MN, AP, or CM with the SWAN infrastructure. A SWAN node is always registered with the CCM and each LCM, SCM, and AP on the path to the CCM. A Registration-Request is always forwarded inbound on a single branch in the SWAN topology. There are two Registration Request types: An "initial" Registration Request is generated to establish a new Path Instance. An "update" Registration Request is used to refresh a Path Instance and to update cached dynamic context information.

A CM returns a Registration-Reply to acknowledge receipt of a registration request, establish a "path instance", and to return context information, including any "old mobility bindings". Registration-Reply messages establish the Layer 2 forwarding path on wireless links. A Registration-Reply is always forwarded outbound on the reverse path of the corresponding request.

Preregistration Request and Preregistration Reply messages are used to obtain security credentials and establish the authentication state for an 802.11 MN or child AP prior to registration.

A CM sends a Deregistration-Request message to request deletion an old path instance when a station roams. A Deregistration-Request is always generated by a CM (SCM, LCM, or CCM) and is always forwarded outbound on a single branch in the SWAN topology.

An AP or CM returns a Deregistration-Reply to acknowledge receipt of a Deregistration Request, delete the respective path instance, and (optionally) to return context and status information. Transient accounting statistics and an activity timestamp are (optionally) returned in the Deregistration Reply.

An AP or CM sends a Detach-Request message to its parent CM to indicate that a "detached" child station should be "deregistered". A Detach-Request message is forwarded inbound until it reaches either a CM with a "newer" registration record or the CCM.

A CM can send a Detach-Reply message to acknowledge a Detach-Request.

A Context-Request message is used to get or set context, configuration, or management information. Context messages provide a general-purpose transport for exchanging information. A Context-Request can be used, for example, to initiate a lateral handoff when a station roams from an old LCM to a new LCM. The new LCM or the old LCM may send the Context-Request. A Context-Request that is generated by the old LCM may contain context and configuration information. A Context-Request message can also be used to predictively forward mobility context for a MN to SCMs or APs. [A Context-Request that is used to "get" information contains one or more "request" TLVs.]

A Context-Reply message is used to acknowledge a Context-Request message. It is also used to return status information (e.g. for a "set" request) or context, configuration, or management information (e.g. for a "get" request) for a corresponding Context-Request message.

A Path-Update-Request message is used to re-establish the backward-learned path between a wireless station and each correspondent host, when the wireless station roams from an old AP to a new AP within a single subnet. The Path-Update-Request is sent from the new AP to the old AP, with the source 802 address of the station that roamed.

A Path-Update-Reply message is, optionally, used to acknowledge a Path-Update-Request message and it is used to transfer transient context information directly from an "old AP" to a "new AP".

A Path-Check message is used to implement a Reliable Path Update mechanism (i.e. to recover from lost Path-Update-Request messages).

A Trace-Request message is used for SWAN path testing, response time analysis, and station tracking.

A Trace-Reply is used to acknowledge a Trace Request.

AAA messages are encapsulated 802.1X EAPOL messages typically used for authentication. Alternately, AAA messages could also be typed to designate the beginning (START) or end (SUCCESS) of an AAA message exchange. Finally, accounting messages typically used by the AP to update the session accounting maintained by the AS. When the MN is employing Cisco's Central Key Management (CCKM), initial key establishment between the MN and MN Authenticator, is triggered by the MN Authenticator initiating a 4-way handshake by sending the MN an EAPOL Key message with a 16byte nonce. To achieve this, a nonce is passed from the MN Authenticator to the AP using an AAA Success message. This is the only EAPOL Key message generated by the SWAN Topology, all others are results of 802.1X EAP Authentication.

AAA messages are WLCCP encapsulations of 802.1X EAPOL or Cisco session accounting messages and thus do not follow the Request-Reply norm. However, since Authenticators can detect authentication failures, the Status field provided in the outbound messages can provide more information to reflect authentication status.

Path-Init Request, Reply, Confirm, Ack. Path-Init messages are used for IN path authentication, where an IN mutually authenticates and establishes a path CTK with each of its ancestors. The necessary path authentication 4-way handshake may consist of 1) a Path-Init RequesVReply exchange followed by an initial Registration Request/Reply exchange, or 2) a Path-Init Request/Reply/Confirm/Ack exchange. (The second sequence is used to refresh path CTKs for a registered IN.)

WLCCP messages can be encapsulated in Ethernet frames or UDP/TCP/IP packets. Ethernet encapsulation can be used for intra-subnet messages sent between two APs or an AP and SCM, which are on the same subnet. IP encapsulation is used for inter-subnet messages. The WLCCP Ethernet DIX type is 0x872d. The WLCCP UDP/TCP protocol port is decimal 2887. It is a "well-known" protocol port that is registered with the Internet Assigned Number Authority.

A single WLCCP message format is used for both Ethernet and IP encapsulation. All WLCCP messages share a common header format. The header format is defined so that it is unambiguous with existing Ethernet and IP DDP message formats. The WLCCP message body, which follows the common header, contains SAP-specific message types.

An example Ethernet-encapsulated WLCCP Context Management frame 2000 is shown in FIG. 4. The frame 2000 comprises the destination MAC address 2002, the source MAC address 2004, the DIX Type (0x872D for this example) 2006, is WLCCP Common Header 2008, WLCCP Context management header 2010, Type-specific fields 2012, and Optional TLVs 2014.

In general, Ethernet encapsulation can be used for WLCCP messages that are limited to a single subnet. IP encapsulation is used for all inter-subnet messages. Ethernet encapsulation is used for SCM-Advertisement messages and intra-subnet Registration, Deregistration, Detach, Path-Update, and Path Check messages. UDP/IP encapsulation is used for CCM Advertisement messages and inter-subnet Registration, Deregistration, and Detach messages. Either Ethernet or UDP/IP encapsulation can be used for Trace messages. Ethernet, UDP/IP, or TCP/IP encapsulation can be used for Context messages.

Referring now to FIG. 5 there is a table illustrating the fields for a WLCCP Message Header 2100. The columns comprise the Field Name 2102, Offset 2104, Size 2106 and a Description 2108 of each field of the message header 2100.

In this example, the length of the fixed WLCCP header 2100 is 28 bytes. The fields Protocol ID/Version 2110, WLCCP SAP 2112 and Destination Node type 2114 are common to all WLCCP SAPs. The remaining fixed fields are common to all Context Management frames (i.e. all frames defined in this document). If the Relay Flag is set ON, then the header is immediately followed by an 8-byte Relay Node ID field.

The WLCCP Protocol ID 2110, 0xC0, is defined so that WLCCP and DDP messages can share the same DIX Ethernet type and UDP protocol port.

The Destination Node Type 2114 and WLCCP SAP 2112 fields are used to select the internal destination within the device identified by the Ethernet or IP destination address. The sender must set the Destination Node Type 2114 to the node type of the immediate receiver, before sending a WLCCP message. The Destination Node Type 2114 can be '0' if the SAP uniquely identifies the internal destination.

The Hop Count 2116 field contains the number of WLCCP hops (minus one) between the Originator and Responder. The Originator or Responder must initialize the Hop Count to '0'. The Hop Count is incremented by each intermediate node on the path to the Originator or Responder. A message is discarded if the Hop Count exceeds a predetermined maximum hop count.

The Flags field 2120 is used as follows: The Retry flag is set ON in retransmitted Request or Confirm messages. The Message ID in a retransmitted message is the same as in the original message. The Retry flag is set ON in a Reply or Ack message if it is set ON in the corresponding request message. The Response-Req Flag is set ON in a request message to solicit a reply. The TLV flag is set ON to indicate that optional TLVs follow the fixed fields. The Inbound Flag, Outbound Flag, and Hopwise-Routing Flag determine how a WLCCP message is forwarded (as described below). If the Root CM Flag is set ON in an inbound message, then the message is always forwarded to the CM at the root of the entire Topology Tree—the "root CM". If the Root CM Flag is set ON in an outbound message, then the message originated at the root CM. If the Relay Flag is set ON, then the WLCCP header is immediately followed by a 64-bit Relay Node ID field (a 16-bit Node Type followed by a 48-bit Node Address). The MIC flag is set ON to in a message that must be authenticated and contains a WTLV_MIC TLV. The Responder Node Type bits contain the Node Type of the WLCCP node that generated the original reply message.

The Originator Node ID 2122, generally, identifies the node that originated a request message. The Responder Node ID 2124 generally identifies the target of a request message and the source of the corresponding reply message. In a WLCCP Registration message for a MN, the Originator Node ID is the 802 address of the MN. The Responder Node ID may be '0' in Registration Request, Advertisement Request, or Detach Request messages. The Responder Node ID may be '0' in any IP-encapsulated Request message. The Responder Node ID identifies the source of a solicited or unsolicited Advertisement Reply message.

The Hop Source Node ID contains the WLCCP Node ID of the hop source of a request or reply message.

Optional parameters may follow the fixed fields in any WLCCP message. Optional parameters are in the "TLV" format as shown in FIG. 6.

Figures 6, 7, 8:
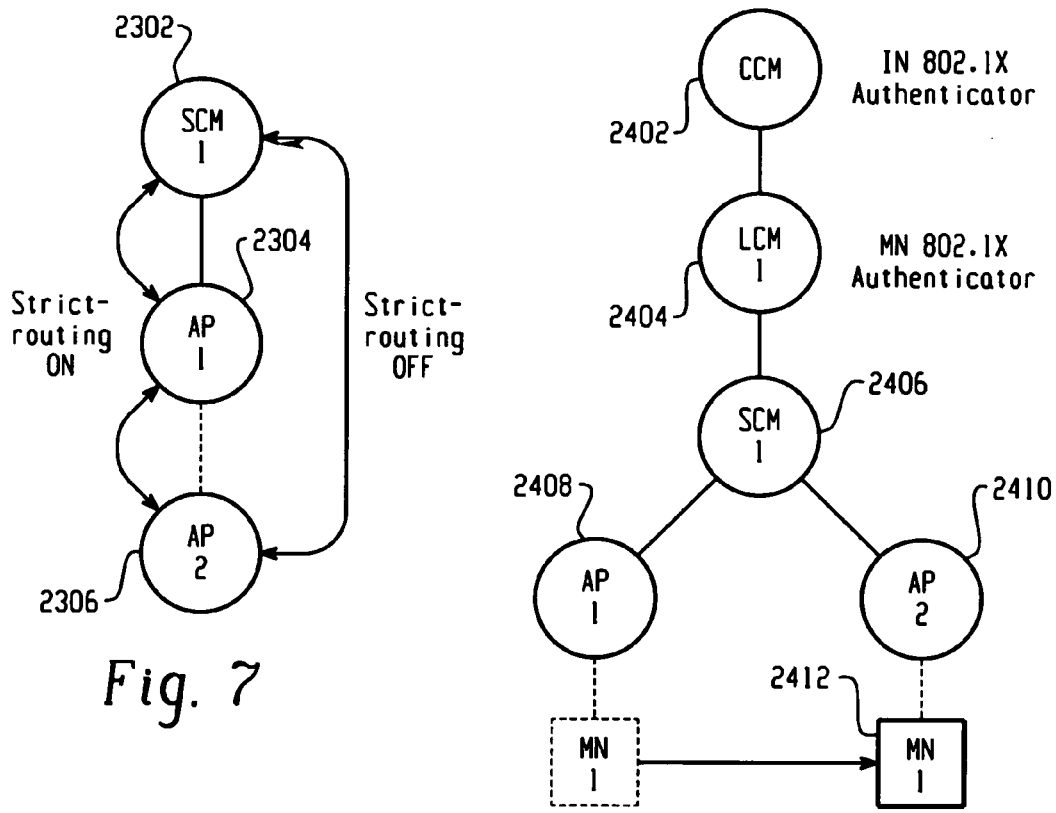
FIG. 6 is an example of a TLV format.
FIG. 7 is a block diagram illustrating hopwise routing.
FIG. 8 is a block diagram illustrating a handoff from a first access point to a second access point for a mobile node on a campus topology.

Referring to FIG. 6, the TLV Format includes a Field Name 2202, Offset 2204, size (in bytes) 2206 and a description 2208. The TLV "Type" 2210 field contains a Container Flag, an Encrypted Flag, a Request Flag, a Group ID and a Type ID. A "request TLV" has the Request Flag set ON in the Type ID field.

TLV Group IDs are used to group TLVs hierarchically. A Group ID can be used to identify the software module in the target node that must process the respective TLV type.

The Request Flag is set on in a TLV in a WLCCP request message to "request" information from the target WLCCP node. A "request TLV" has the Request Flag set ON.

The TLV Container Flag can be used to group fixed attributes and other optional TLVs into a single "container TLV". The Container Flag should only be set ON in a TLV if any required TLV fields are followed by other optional TLVs. Container TLVs can be nested.

The table below shows the fields for an SCM Advertisement Reply Message.

| Field Name | Offset | Size (bytes) | Description |
| --- | --- | --- | --- |
| WLCCP Header | 0 | 28 | Common Context Mgmt SAP Header |
| Hop Address | 28 | 6 | Source 802 Port Address |
| SCM Flags | 34 | 2 | Bit 15 - Active Flag. Set ON in advertisements from the active SCM. Bit 14 - Unscheduled Flag (set ON in unscheduled advertisement messages) Bit 13 - Unattached Flag* (set ON in advertisements from an unattached node) Bit 12 - Layer 2 Update Flag (set ON if WLCCP Layer 2 path updates are enabled. Set OFF by default). Bits 0-11 - (reserved - must be zero) |
| SCM Election Group | 36 | 1 | (reserved for future use - must be zero) |
| Attach Count | 37 | 1 | Attach count of the hop source |
| SCM Priority | 38 | 1 | Bits 1-7 - SCM Priority value from 0 (lowest) to 127 (highest). Bit 0 - Preferred Flag - Set OFF if the SCM is the "preferred SCM". |
| Bridge Priority | 39 | 1 | Bits 1-7 - Bridge Priority value from 0 (highest) to 127 (lowest). Bit 0 - Bridge Disable Flag. Set ON to indicate that secondary bridging is disabled. The Bridge Priority is used to negotiate the WLCCP designated bridge on a non-STP secondary Ethernet LAN. |
| Instance Age | 40 | 4 | The "instance age" of the SCM, in seconds |
| SCM Node ID | 44 | 6 | WLCCP Node ID of the SCM |
| Path Cost | 50 | 2 | Sum of port costs on the path to the SCM |
| Hop Count | 52 | 1 | Number of wireless hops on the path to the SCM |
| Advertisement Period | 53 | 1 | The average number of seconds between SCM advertisements. |
| (Optional TLVs) | 54 | N | (required TLVs are defined below) |

*A parent node sends an SCM Advertisement Request with the Unattached Flag set ON to quickly notify child nodes that it has become "unattached". If it is unattached because the active SCM was lost, then it also sets the SCM Node ID to '0'.

The Instance Age field contains the "age" of the instance of the node that transmits an SCM-Advertisement Reply message, in seconds.

An SCM Advertisement Reply message includes a TLV, which contains the IP address and subnet mask of the SCM. An SCM Advertisement Reply message also includes a TLV which contains the IPv4 address of the root CM (which is also the 802.1X IN Authenticator). An SCM Advertisement Reply message sent by an AP can include a TLV which contains the AP's IP address.

A Request message is always forwarded from the Originator to the Responder. A Reply message is always forwarded from the Responder to the Originator. The Inbound and Outbound flags determine how a message is forwarded. If both the Inbound and Outbound flags are set OFF, then a message is forwarded via IP routing and/or transparent bridging to the target destination (i.e. to the "Responder" in a Request message).

The Inbound Flag or Outbound Flag is set ON in a message to indicate that the message is being forwarded inbound or outbound, respectively, on a branch of the Topology Tree. It is an error if a node receives an "inbound" message from a node that is not a descendant. It is also an error if a node receives an "outbound" message from a node that is not an ancestor.

The Hopwise-Routing Flag is set ON in an inbound or outbound message to force intermediate APs to process the message, where an "intermediate AP" is any AP on the topology tree branch between the Originator and the Responder of the message. A "hopwise-routed" inbound message is forwarded to the hop address of the parent node; an outbound message is forwarded to the "Next Hop" on the path to the target node. A hopwise-routed message is processed by each node on the inbound or outbound path. It is an error if a node receives a hopwise-routed message from a Hop Source that is not a neighbor.

The Hopwise-Routing Flag can be used in a registration message, for example, to update Layer 2 path information in each AP on the path to a MN. The Responder is the SCM in a Proxy Registration message generated by an AP. FIG. 7 illustrates how hopwise routing is used. If Layer 2 path updating is enabled, then Registration messages are forwarded with Hopwise-Routing set ON. If Layer 2 path updating is not enabled then Registration messages are forwarded with the Hopwise-Routing Flag set OFF.

If the Relay Flag is set ON, in a WLCCP message, then the general WLCCP header is immediately followed by a Relay Node ID field. If the Relay Node ID field is non-zero, then it contains the Node ID of any intermediate node that "relayed" the respective message. The Relay Node ID is initialized to all zeroes by both the Originator and Responder. As shown in FIG. 7, AP 2304 is the relay node for a hopwise-routed message sent from AP 2306 to the SCM 2302; therefore, AP 2304 must set the Relay Flag ON and enter its Node ID in the Relay Node ID field before forwarding the message inbound to the SCM.

If the Root CM Flag is set ON in an inbound request message, then the message is always forwarded inbound to the CM at the root of the entire Topology Tree—the root CM. In a campus network, for example, the message is forwarded to the CCM. For example, an AP can use the Root CM Flag to forward a MN's IP address to the CCM. The AP can simply send a request message to its parent SCM that contains the MN's IP address and has the Root CM Flag set ON.

In many cases the original Responder of a request message must forward the message on the path to the final destination. For example, an SCM forwards an inbound Registration Request to its parent LCM if the SCM is not the "nearest common ancestor" or if the Root CM Flag is set ON. Likewise, an LCM must forward an outbound Deregistration Request to the parent SCM of the Target Node. An original or intermediate "relay Responder" forwards such a message as follows: a) The Responder field is updated with the Node ID of the next-hop CM, b) The relay Responder enters its Node ID in the Relay Node ID field, c) The Originator and Message ID fields are unchanged. The relay Responder does not update the Responder field in any corresponding Reply message; therefore, the Responder field in the Reply message will contain the Node ID of the "final Responder" when it is received by the Originator.

The Originator of a Request message sets the Response-Req Flag ON to solicit a corresponding Reply message. The Originator is always responsible for error recovery if an expected Reply message is not received. An Originator must start a "retry timer" for each outstanding Request message that requires a Reply. A Request message is retransmitted, with the Retry Flag set ON and the original Message ID, if an expected Reply message is not received before the respective timer expires. A retry timer is not needed in an intermediate "relay Responder", which forwards a Request message on the path to the final Responder.

An Originator or relay node can include a Reply_State TLV in a Request message, to reduce the amount of state information that must be kept in memory. A Reply_State TLV contains information that is necessary to process (e.g. forward) a Reply message.

AP message forwarding logic is generally independent of the network infrastructure. The parent SCM is the Responder in messages generated by an AP, with one exception. [If Layer 2 path updating is enabled, then the Responder in an initial Registration Request generated by a non-root AP is the parent AP.] In a local or campus infrastructure, the SCM forwards AP messages to the root CM. Likewise, SCM message forwarding logic is the same in a standalone local infrastructure or a campus infrastructure. The parent LCM is the Responder in messages generated by the SCM. In a campus network, the LCM forwards SCM messages to the CCM, as required.

A WLCCP node only accepts "valid" WLCCP messages transmitted on its native VLAN. All other messages are discarded. A message is invalid if it fails a Message Integrity Check or if the message type is unknown.

SCM Advertisement messages contain an subnet identifier TLV, which uniquely identifies the local subnet, and "Path Cost" and "Hop Count" fields. The Path Cost is used to convey the path cost to the primary LAN for the respective subnet. The Hop Count field is used for backward-compatibility with existing APs and radio firmware and contains the number of wireless hops to the primary LAN. An active SCM sends SCM Advertisement Reply messages with the Path Cost and Hop Count fields set to '0'.

SCM advertisement messages contain a Root CM IP Address TLV, which is used to advertise the IP address of the root CM in the SWAN Topology Tree. The SCM is the Root CM if the SCM is operating in stand-alone mode. If the SCM is operating in infrastructure mode, then the IP address of the LCM or CCM that is at the root of the entire Topology Tree. The Root CM is the default 802.1X authenticator for infrastructure nodes.

SCM advertisment messages contain a Root CM field, which contains the Node ID of the Root CM. An AP can determine if the Root CM changes by monitoring the Root CM field in SCM advertisements.

An AP or SCM candidate can send a multicast SCM-Advertisement Request to solicit an "unscheduled" SCM-Advertisement Reply message. The active SCM sends a unicast unscheduled Reply if it receives a Request on its Ethernet port. An "Attached" AP sends a unicast unscheduled Reply if it receives a Request on a secondary port from a child AP. The unicast MAC destination address in the unscheduled Reply is taken from the Hop Address in the corresponding Request and is the same as the MAC source address in the Request.

An AP does not forward an SCM-Advertisement Request. The SCM and each Attached AP maintains the state information that is necessary to generate an unscheduled SCM-Advertisement Reply (e.g., the information used to generate the last scheduled advertisement message).

An SCM Candidate or AP can set the Responder Node ID to '0' in an SCM-Advertisement Request (i.e. if it does not know the Node ID of the active SCM or parent AP). The actual responder (i.e. the active SCM or a parent AP) enter its Node ID in the Responder field in the Reply message. A non-root AP should set the Responder Node ID, in an SCM-Advertisement Request, to the Node ID of its parent AP, if it is known.

"Initial Authentication" is used to fully authenticate a node when it first enters the network. A MN initially authenticates with the MN 802.1X Authenticator; an infrastructure node (AP or CM) initially authenticates with the IN 802.1X Authenticator in the root CM. Initial Authentication messages are encapsulated in 802.1X EAPOL messages on an 802.11 link between a child and parent 802.11 station. Initial Authentication messages are encapsulated in WLCCP AAA messages on all other links.

An AP or child CM uses "Path Authentication" messages to mutually authenticate and establish a CTK with each of its ancestors. An AP or child CM initiates Path Authentication after it initially authenticates and whenever it path changes.

"Fast Reauthentication" is used to quickly "reauthenticate an 802.11 station (MN or child AP) when it roams to a new parent AP. A parent AP uses "Preregistration" messages to fetch the necessary security context for Fast Reauthentication when an 802.11 station reassociates. Preregistration messages do NOT update the forwarding path.

The WLCCP Registration and Handoff Protocol is used to establish, maintain, and delete branches and path instances in the SWAN Topology Tree. Registration (and deregistration) messages are also use to transfer context information when a node roams. Each authenticated child CM, AP, and MN in a SWAN network is registered with the root of the SWAN Topology Tree—the root CM. In general, each CM, AP, and MN in a sub tree is reliably registered with the CM at the root of the sub tree. Example registration and handoff message sequences are shown in following sections.

The Registration and Handoff Protocol is implemented with three message types—Registration, Deregistration, and Detach.

Each MN, AP, and child CM must successfully authenticate (or reauthenticate) before it is registered with the SWAN infrastructure.

An inbound "initial" Registration Request is generated to initially register a node with the root CM after it has successfully (re)authenticated. A Registration Request is acknowledged by a Registration Reply that contains a matching Message ID. An outbound initial Registration Reply establishes a Path Instance, which is (optionally) identified by a Path ID. An "update Registration Request" is used to refresh the registration state of an Attached station. An update Registration Request is also used to update the context information cached in ancestor nodes.

"Proxy" Registration RequesVReply messages are used to register WLCCP-unaware MNs. A "registered" parent AP generates a proxy "initial" Registration Request for an associated MN after it successfully authenticates.

A Registration message contains an Initial Flag, which is set ON in an "initial" Registration message and OFF in an "update" Registration message. A Registration message has a Proxy Flag, which is set on in a "proxy" Registration message generated "in proxy" by a parent AP for a non-WLCCP MN. An "initial, proxy" Registration message, for example, has both the Initial Flag and the Proxy Flag set ON.

In general, a Registration Request for a node, which has roamed, is forwarded inbound until it reaches the "nearest common ancestor CM". The "nearest common ancestor CM" is the CM that is at the root of the smallest sub tree that includes the CM and both the old and new parent nodes. For example, the SCM is the nearest common ancestor when a MN roams within a single subnet. An LCM is the nearest common ancestor when a MN roams between subnets in the same Local Control Domain. The nearest common ancestor CM is referred to as the "common CM".

The common CM returns a Registration Reply outbound to acknowledge the Registration Request and to establish a new path instance for the "Requester Node". The common CM (optionally) "deregisters" any old path instance, when it establishes the new path instance for the node.

A non-parent CM or AP must forward an "initial" or "proxy" Registration Reply to the "parent" of the Requester Node, identified by the Requester Node ID field. Therefore, the parent node is the Originator of any "initial" or "proxy" Registration Request that it forwards inbound for a child Requestor Node.

The Root CM Flag is set ON in a Registration Request to force a "full path update". A Registration Request is always forwarded to the root CM if the Root CM Flag is set ON.

The Path ID field in an "initial" Registration Request is always set to '0'. The parent CM (optionally) establishes the path ID, for a path instance, by entering a path ID value into the Path ID field of an initial Registration Reply. The Path ID field in an "update" Registration Request is set to the path ID for the path instance.

A Registration Request is always transmitted with the Response-Req Flag set ON, to solicit a Reply. A Registration Request message is retransmitted if an expected matching Reply is not received, until a predetermined maximum limit is exceeded. The same Message ID is used for the original Registration Request and all retransmissions.

In general, received Registration Requests are ordered by time-of-arrival. The Registration Delay field is, optionally, used to order received Proxy Registration Requests that are generated by a parent AP for a child node. The Delay field contains the elapsed time, in hundredths of seconds, since the respective child node last transmitted an uplink frame. A Registration Record in a CM must contain a timestamp field that contains the "time-of-arrival" of the last Registration Request. The time-of-arrival is calculated by subtracting the Delay value from the current time.

A parent AP or SCM forwards a Registration Reply to a child AP by sending it to the port MAC address contained in the Hop Source field in the original Registration Request. A parent CCM or LCM forwards a message to a child CM by sending it to the hop IP address of the child CM.

If WLCCP is used to establish forwarding paths, then an "old" path instance is deleted when a node roams. Inbound Deregistration Reply and Detach Request messages are optionally used to delete old path instances. A Deregistration Request is generated by a "common CM" to delete any old path instance when a new path instance is established. Also, an "administrative" Deregistration Request can be generated by the Root CM to administratively disconnect a node.

A parent AP generates a Detach Request, when a child node is disassociated. If the child node is an AP, then the sub tree rooted at the AP is deleted. Deregistration and Detach logic is described in more detail below.

Each AP in a subnet, and any MNs associated with the AP, are registered with the active SCM for the subnet. An AP discovers the "active SCM" via the SCM advertisement protocol, as described above. Each MN is registered with the SCM for its parent AP, even if the MN belongs to a different subnet.

Intra-subnet registration logic is implementation-specific. In the simple, single SCM implementation, WLCCP registration is used to establish and distribute context information between the SCM and child APs. It is not used to establish the Layer 2 forwarding path. The L2-Path-Update Flag is set OFF and the Hopwise-Routing Flag is set OFF in Registration messages in the single SCM implementation. Detach and Deregistration messages are not used in the single SCM implementation.

If Layer 2 path updating is enabled, then WLCCP registration reliably establishes the wireless forwarding path between the primary LAN and wireless stations, so that it is not necessary to flood unicast frames to 802.11 stations. Registration, Deregistration, and Detach messages are forwarded with Hopwise Routing so that each AP on the path instance can process the message. A Registration Reply, for example, is forwarded outbound, with hopwise routing, by sending it to the MAC or IP destination address of the "next hop" on the path to the target node. A Deregistration Reply or Detach Request is forwarded inbound, with hopwise routing, by sending it to the MAC or IP destination address of the parent node identified in the "Parent Node Record". Non-WLCCP bridges and switches transparently forward registration messages.

Referring to FIG. 8 there is shown a block diagram illustrating a mobile node 2412 roaming from a first access point 2408 to a second access point 2410 on a campus network 2400. The network 2400 comprises a CCM 2402 which is an IN 802.1X Authenticator, an LCM 2404 which is a MN 802.1X authenticator, an SCM 2406, a first access point 2408, second access point 2410, and the mobile node 2412.

Figure 9A:
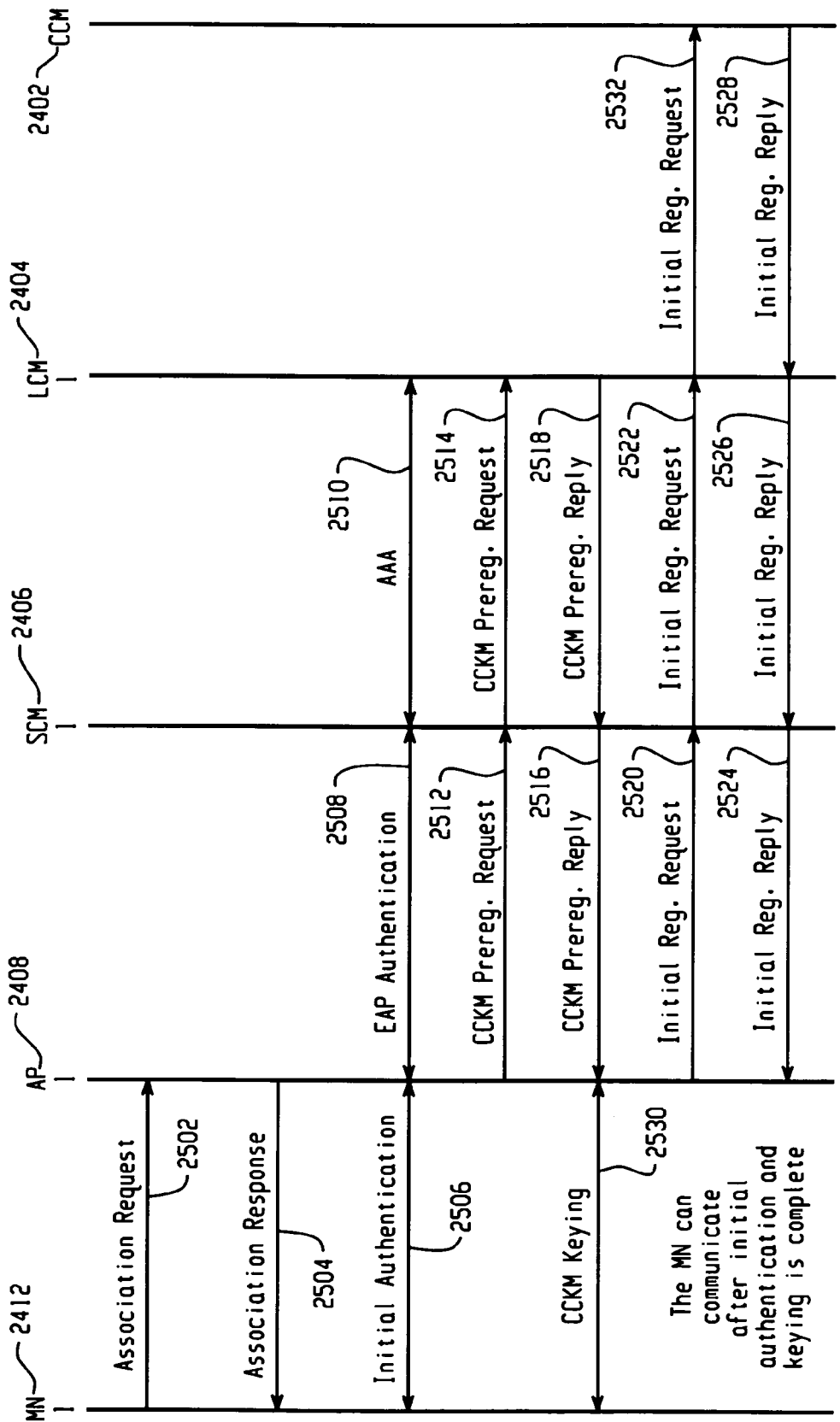
FIG. 9a is an example of the message sequences for initial mobile node association.
Figure 9B:
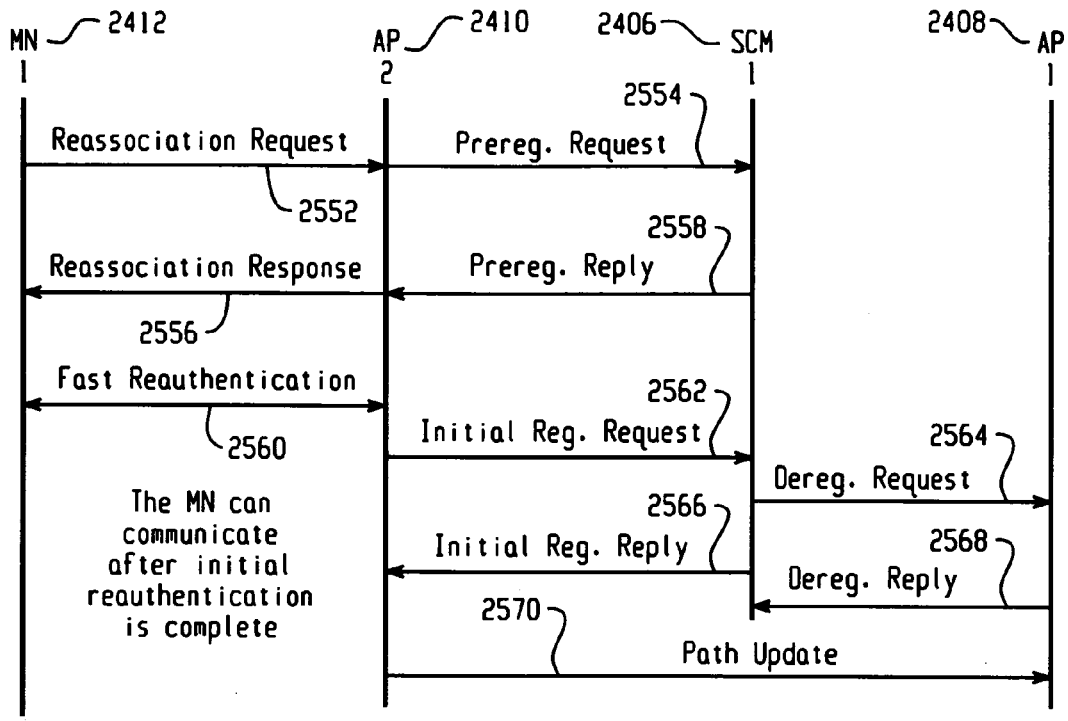
FIG. 9b is an example of the message sequences for a mobile node roaming from a first access point to a second access point.

The message sequences for registering and deregistring mobile node 2412 are shown in FIGS. 9a and 9b. FIG. 9a shows the message sequences for the mobile node 2412 as it first associates and authenticates with access point 2408, and FIG. 9b shows the message sequences as the mobile node 2412 roams to the second access point 2410. The arrows indicate the direction of the message (source -> destination or bidirectional <->) and the vertical bars indicate the network component.

Referring first to FIG. 9a, the mobile node 2412 associates with the first access point 2408. The steps comprise sending the assocation request 2502 from the mobile node 2412 to the first access point 2408 and the first access point 2408 sending an association response 2504. The mobile node 2412 then authenticates with LCM 2404 (which for this example is the MN 802.1X authenticator for mobile node 2412) and the first access point 2408. The mobile node 2412 performs an initial authentication 2506 with the first access point 2408, an EAP authentication 2508 is then performed between the first access point 2408 and the SCM 2406, and a AAA request 2510 is performed between SCM 2406 and LCM 2404.

For CCKM mobile nodes, preregistration is required. The preregistration starts by the firs access point 2408 sending an initial proxy registration request 2512 to SCM 2406. SCM 2406 then forwards the initial registration request 2514 to LCM 2404 The CCKM preregistration reply 2418 is sent from LCM 2404 to SCM 2406, then as shown by 2516 from SCM 2406 to the first access point 2408, and the first access point 2408 sends the CCKM keying 2530 to the mobile node 2412. The mobile node 2412 can communicate after initial authentication and keying is complete.

The first access point then sends an initial proxy registration request 2520 to the SCM 2406, the SCM 2406 then forwards the initial proxy registration request request 2522 to the LCM 2404 with the LCM 2404 as the responder, then LCM 2404 forwards the initial registration request 2532 to the CCM 2402 with the CCM as the responder. The CCM 2402 then sends an initial registration reply 2528 to LCM 2404. LCM 2404 then forwards the initial registration reply as shown by 2526 to the SCM 2406. The SCM 2406 then forwards the initial registration reply to the first access point 2408 as shown by 2524.

Referring now to FIG. 9b, there is illustrated the messaging sequence when the mobile node roams from the first access point 2408 to the second access point 2410. Mobile node 2412 reassociates with the second access point 2410 by sending a reassociton request 2552. access point 2410. The second access point 2410 then sends a preregistration request 2554 to SCM 2406 to obtain the dynamic credentials for the mobile node 2410. SCM 2406 then sends a preregistration reply 2558 to the second access point 2410. The second access point 2412 then sends a reassociation response 2556 to the mobile node 2412. The mobile node 2412 then re-authenticates with the second access point 2410 using its dynamic credentials by fast reauthentication 2560. The mobile node can communicate after reauthentication is complete. The second access point 2410 then sends an initial proxy registration request 2562 to SCM 2406 for the mobile node 2412. SCM 2406 then sends a deregistration request 2564 to the first access point 2408. SCM 2406 then sends a initial registration reply 2566 to the second access point 2410. The first access point 2408 sends a deregistration reply 2568 to SCM 2406. The second access point 2410 sends a path update request 2570 to the first access point 2408.

Figure 10:
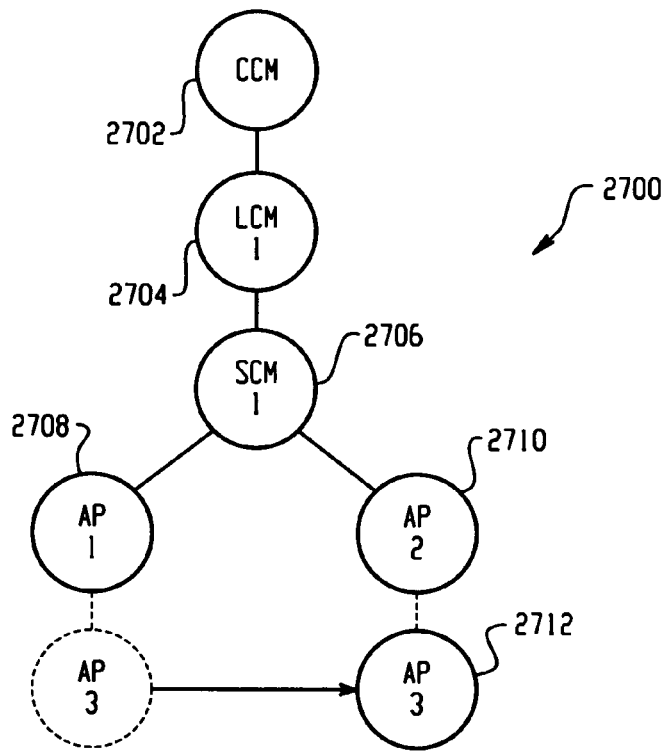
FIG. 10 is a block diagram illustrating a handoff of a repeater access point from a first access point to a second access point.

Referring to FIG. 10 there is shown a block diagram illustrating a repeater access point 2712 roaming from a first access point 2708 to a second access point 2710 on a campus network 2700. The network 2700 comprises a CCM 2702 which is an IN 802.1X Authenticator, an LCM 2704, an SCM 2706, a first access point 2708, second access point 2710, and the repeater access point 2712.

Figure 11A:
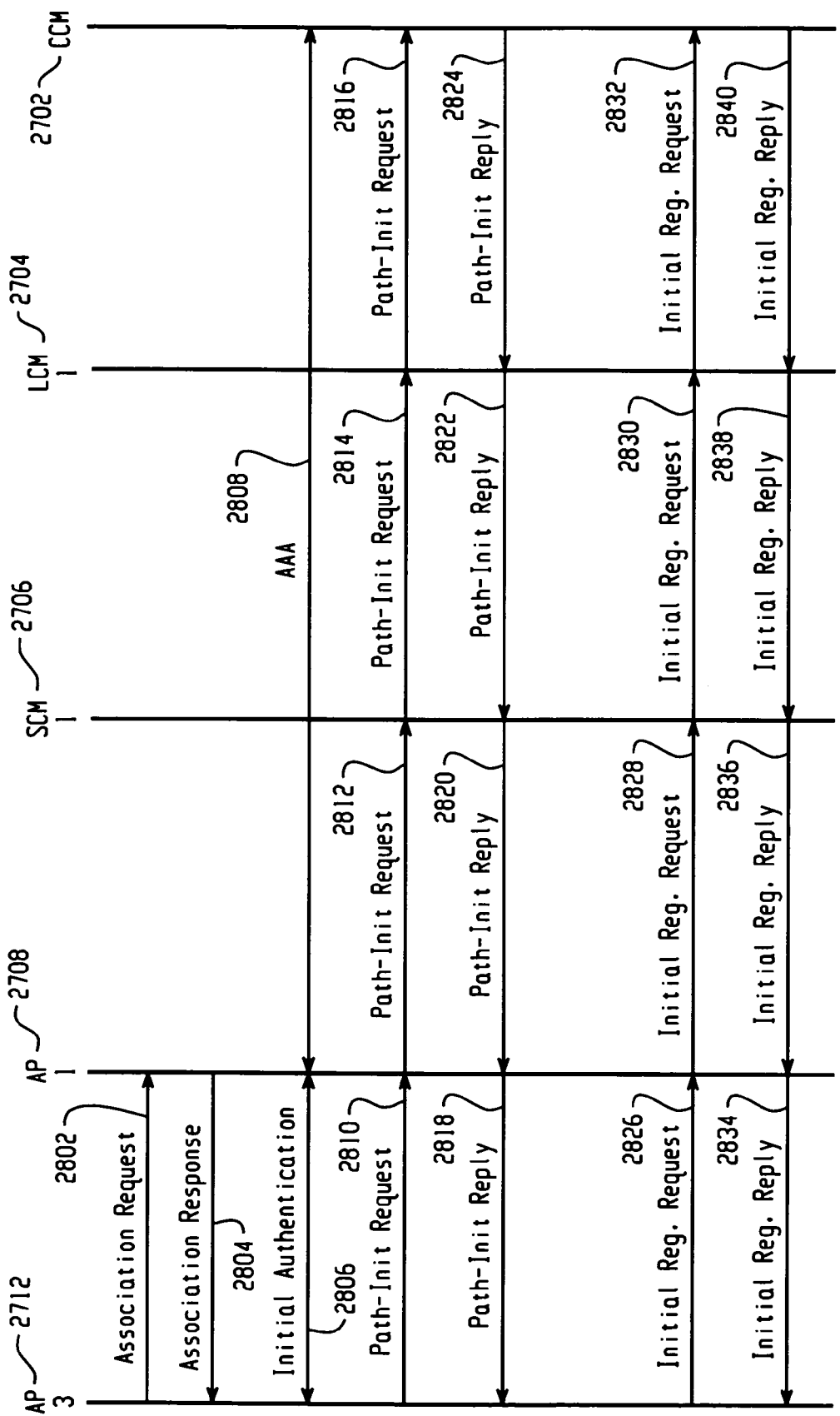
FIG. 11a is an example of the message sequences for initial repeater access point association.
Figure 11B:
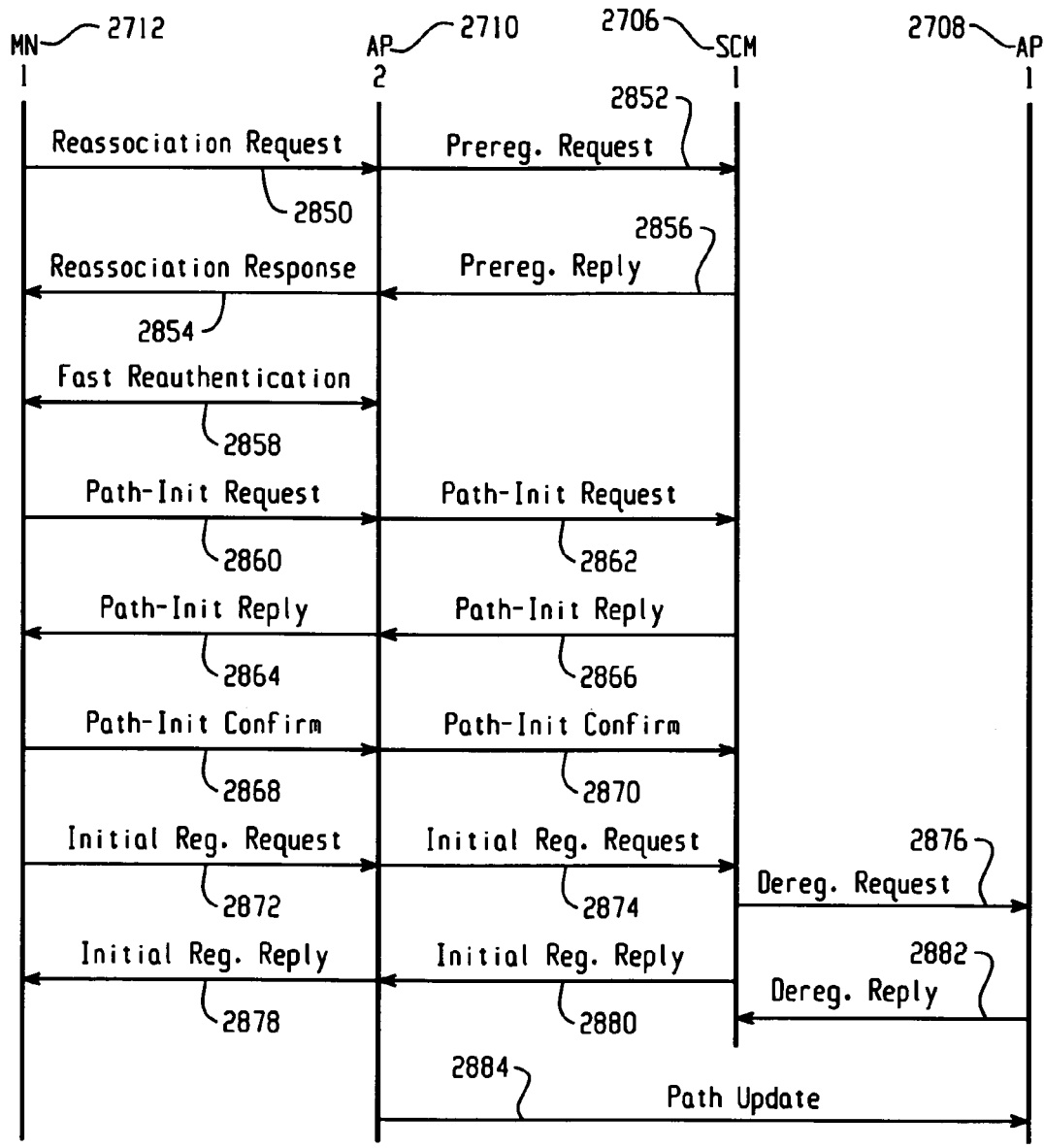
FIG. 11b is an example of the message sequences for a repeater access point roaming from a first access point to a second access point.

The message sequences for registering and deregistering repeater access point 2712 are shown in FIGS. 11a and 11b. FIG. 11a shows the message sequences for the repeater access point 2712 as it first associates and authenticates with access point 2708, and FIG. 11b shows the message sequences as the repeater access point 2712 roams to the second access point 2710. The arrows indicate the direction of the message (source ->destination) and the vertical bars indicate the network component.

Referring to FIG. 11a, the repeater AP 2712 (AP 2712) associates with the first access point 2708 (AP 2708). This process comprises AP 2712 sending an association request 2802 to AP 2708 and AP 2708 responding with an association response 2804. AP 2712 then authenticates with CCM 2702, the IN 802.1X Authenticator for AP 2712 and AP 2708, in this example, via initial authentication 2806 and AAA 2808.

AP 2712 then sends a Path-Init request to AP 2708 with AP 2708 as the responder. AP 2708 then sends the Path-Init Request to SCM 2706 as shown by 2812 with SCM 2706 as the responder. SCM 2706 forwards the Path-Init Request to LCM 2704 as shown by 2814 with LCM 2704 as the responder. LCM then forwards the Path-Init request to CCM 2702 as shown by 2816 with CCM as the responder. As shown by 2834, CCM 2702 then sends a Path-Init Reply to the LCM 2704 with AP 2708 as the originator. The LCM 2704 sends the Path-Init reply to SCM 2706 with AP 2708 as the originator as shown by 2822. SCM 2706 sends the Path-Init reply to AP 2708 as shown by 2820. AP 2708 sends the Path-Init reply to AP 2712 as shown by 2818.

AP 2712 then sends an Initial Registration Request 2826 to AP 2708 with AP 2712 as the Responder. AP 2708 sends the Initial Registration Request to SCM 2706 for AP 2712 with SCM 2706 as the Responder at 2828. At 2830, SCM 2706 forwards the Initial Registration Request to LCM 2704 with LCM 2704 as the Responder. Then at 2832, LCM 2704 forwards the Initial Registration request to CCM 2702 with CCM 2702 as the Responder. At 2840 CCM 2702 sends an Initial Registration Request Reply to LCM 2704. At 2838 LCM 2704 then forwards the Initial Registration Request Reply to SCM 2706. Then at 2836 SCM 2706 forwards the Initial Registration Request Reply to AP2708, which then at 2834 forwards the Initial Registration Request Reply to AP 2712.

Referring now to FIG. 28b there is shown the sequence of messages that occurs when the repeater AP (AP 2712) roams from the first access point 2708 (AP 2708) to a second access point 2710 (AP 2710). The process begins at 2850 when AP 2712 sends a reassocation request to AP 2760 and indicates a "fast reauthentication" capability. At 2852 AP 2710 then sends a Preregistration Request to SCM 2706 to obtain the dynamic credentials for AP 2712. SCM 2706 sends a Preregistration reply to AP 2710 at 2856. AP 2720 then sends a reassociation response to AP 2712 at 2854. At 2858 AP 2712 reauthenticates with AP 2710 using its dynamic credentials.

AP 2712 then sends a Path-Init Request to AP 2710 at 2860 with AP 2710 as the Responder. At 2862 AP 2710 sends a Path-Init request to SCM 2706 for AP 2712 with SCM 2706 as the Responder. SCM 2706 sends a Path-Init Reply to AP 2710 at 2866 with AP 2710 as the Originator. At 2864 AP 2710 sends a Path-Init Reply to AP 2712.

At 2872 AP 2712 sends an Initial Registration Request to AP 2710 with AP 2710 as the Responder. At 2874 AP 2710 sends an Initial Registration Request to SCM 2706 for AP 2712 with SCM 2706 as the Responder. At 2876 SCM 2706 sends a Deregistration Request to AP 2708. At 2880 SCM 2706 sends an Initial Registration Reply to AP 2710. At 2878 AP 2710 sends an Initial Registration Reply to AP 2712. At 2882 AP 2708 sends a Deregistration reply to SCM 2706. AP 2710 sends a Path-Update Request to AP 2708.

A single active SCM is elected for each subnet. By default, APs on a subnet operate in "distributed mode" if no SCM candidates are configured for the subnet The active SCM either operates in 1) Stand-alone Mode or 2) SWAN Infrastructure Mode. An SCM operates in Stand-alone mode whenever it cannot communicate with a parent LCM. In Infrastructure Mode, an SCM is registered with a parent LCM and forwards WLCCP messages to its parent CM. The LCM co-located with the CCM is the default backup LCM for all SCMs.

If an active SCM transitions from Stand-alone mode to Infrastructure mode then any existing sub tree rooted at the SCM is deleted, to force all nodes in the sub tree to reregister. An SCM resets its Instance Age to '0' to delete its sub tree. The sub tree rooted at an SCM does not need to be rebuilt when an SCM transitions from Infrastructure Mode to Stand-alone mode. The SCM functions as the IEEE 802.1X authenticator for its subnet, in stand-alone mode.

The SCM is the 802.1X IN and MN Authenticator IN if the SCM is operating in standalone mode. In standalone mode, the SCM maintains an Authenticated Node Table, which is a list of Authenticated Node Entries. Each Authenticated Node Entry contains authentication state information for APs and MNs in the sub tree rooted at the SCM. The authentication state in a node entry is initialized to 'unauthenticated'.

The active SCM must maintain a Registration Table, which contains state information for each AP and MN in its sub tree. An AP Registration Table contains an AP Registration Record for each AP in its subnet. A MN Registration Table contains a MN Registration Record for each MN that is associated with an AP in the subnet. A Registration Record is created or updated when a Registration Request is received for an AP or MN. A Registration Record contains a cross reference to an Authenticated Node Entry. A MN Registration Record contains a cross reference to the AP Registration Record for the MN's parent AP. A Registration Record is aged and discarded if a successful Registration Request is not received for the respective node with the registration Lifetime.

An SCM candidate must send a Path-Init Request to its assigned parent after it has successfully authenticated with the root CM, to initiate Path Authentication. The CCM functions as a KDC to mutually authenticate the SCM Candidate and establish a shared CTK. An (optional) WLCCP "multicast CTK" is forwarded to the SCM during the Path Authentication process. The SCM candidate (optionally) uses the WLCCP multicast CTK to sign SCM Advertisement Reply messages. The CTK shared by an SCM Candidate and the LCM is not used, if the SCM Candidate is not elected as the active SCM.

A WLCCP AP either operates in 1) "Distributed Mode" or 2) SWAN "Infrastructure Mode".

The AP operational mode depends on the presence of an SCM and on an AP "Operational Mode" parameter, which can be set to one of the following values:
 a) Infrastructure-only
 b) Automatic-fallback (default)

A WLCCP AP operates in "infrastructure mode" if it discovers a SWAN SCM. An AP operates in "distributed mode" if it cannot register with the active SWAN SCM and "Operational Mode" is set to "Automatic-fallback". The CISCO Datagram Delivery Protocol (DDP) is used as the inter-AP protocol, in distributed mode. It should be noted that a WLCCP Context or Path-Update messages can be used, in distributed mode, to directly transfer context from an "old AP" to a "new AP", when a station roams. The "old AP" MAC address can be obtained from an 802.11 Reassociation message.] Each AP must function as the 802.1X authenticator, in distributed mode. APs should operate in distributed mode if the network contains non-WLCCP APs.

An AP can NOT operate in "distributed mode" if "Operational Mode" is set to "Infrastructure-only". AP operation in infrastructure mode is generally the same in a standalone subnet infrastructure, a standalone local infrastructure, or a campus infrastructure.

An AP that is operating in infrastructure mode is considered "Attached" if it is registered with the active SCM; otherwise, it is considered "Unattached". An AP that is operating in "distributed" mode is considered "Attached" if it has a good Ethernet link, which is configured in parent or parent/child mode, or if it is associated with a parent AP; otherwise, it is considered "Unattached". An Unattached AP must prohibit 802.11 station associations, to prevent stations from associating with an AP that cannot provide access to the Primary LAN. A management station can use a special "Management SSID" to associate with an Unattached AP, when other station associations are prohibited.

A child 802.11 bridge or repeater AP cannot operate in infrastructure mode unless it is associated with a parent AP that is operating in infrastructure mode. A parent AP that is operating in infrastructure mode transmits periodic SCM Advertisement Reply messages to child APs and bridges.

An AP must monitors SCM Advertisement Reply messages received on its primary port on the native VLAN to determine if there is an active SCM for the native VLAN. An AP operates in infrastructure mode and executes the WLCCP protocol if there is an active SCM for the AP's native VLAN.

An AP updates its "Parent SCM Record" each time it receives an SCM Advertisement Reply message. Infrastructure mode is enabled when an AP first receives an SCM Advertisement with the "Active_Flag" set ON. An AP generates SCM Advertisement Reply messages on each of its secondary ports, using one of the following methods: 1) An AP can simply generate SCM Advertisements on each of its secondary ports when it receives an SCM Advertisement on its primary port, or 2) an AP can start a periodic timer and generate SCM Advertisements on its secondary ports each time the timer expires. The period of the timer is the non-zero Advertisement Period value in advertisements received on the primary port. The first method must be used if the Advertisement Period value is zero in advertisements received on the primary port.

A repeater AP sends a multicast SCM Advertisement Request on its primary port when it first associates with a parent AP, to solicit a unicast unscheduled SCM Advertisement Reply message.

SCM Advertisement Reply messages are not transparently forwarded by WLCCP APs. Instead, a registered AP generates "secondary" SCM Advertisement Reply messages, on each of its active secondary ports, with the same period as the SCM. The advertisement period is contained in SCM Advertisement Reply messages. SCM Advertisement Reply messages are not transmitted on the AP primary port or on AP ports that are "blocked" by the underlying STP.

SCM advertisements, which are transmitted on AP secondary ports, contain updated "path cost" and "hop count" values. Each AP port is assigned a user-configurable "path cost". Default path cost values are defined for each AP port type (e.g. Ethernet, 802.11a, 802.11b). The updated path cost is calculated by adding the path cost assigned to the AP's primary port to the parent AP's path cost (i.e. the path cost in SCM advertisements received on the primary port); the "hop count" is incremented by '1', if the AP's primary port is a wireless port. A subnet address and updated path cost and hop count information is also advertised in 802.11 Beacon and Probe Response messages, sent on AP 802.11 secondary ports, so that unassociated wireless APs and MNs can quickly discover the least-cost path to the primary LAN (i.e. without iteratively associating and authenticating with each potential parent AP).

An AP may register with a logical SCM that is contained in the same hardware box. In that case, the cost assigned to the "internal primary port" should be consistent with Ethernet port cost (i.e. to prevent stations from migrating to an AP that is co-located in the same box as an SCM).

A non-SWAN AP may transparently forward SCM Advertisement Reply messages generated by a different SWAN node. A child AP must discard any SCM Advertisement Reply messages that are not generated by its parent. A child AP can use the SCM Advertisement Hop Source field to determine if its parent AP generated an SCM Advertisement message. The Hop Source address must be the same as the parent AP's Hop Address.

Root APs are bound to the active SCM on the native VLAN. A Root AP receives SCM Advertisement Reply messages on its native VLAN on the primary port. A non-root AP must belong to the same subnet as its parent AP; therefore, a non-root AP is always bound to the same SCM as the parent (or ancestor) root AP.

SWAN APs are configured with a single "WLCCP SSID". A campus-wide WLCCP SSID is sufficient if a campus network only contains root APs or if non-root APs can dynamically bind to any subnet. Subnet-specific WLCCP SSIDs can be used to bind non-root APs to a specific subnet (i.e. the subnet with root APs with a matching WLCCP SSID). [A child AP can use DHCP to dynamically bind to a subnet; however, the native VLAN and the set of enabled VLANs in a parent and child AP must match.]

A child 802.11 port (i.e. in a repeater AP or child 802.11 bridge) uses the WLCCP SSID to associate with a parent AP. A child AP sends Probe Requests that contains the WLCCP SSID and potential parent APs reply with a Probe Response that also contains the WLCCP SSID. A child AP can only attach to a parent AP with a matching WLCCP SSID.

An AP or child CM must authenticate its path to the root CM, after it has successfully authenticated with the 802.1X IN Authenticator, to mutually authenticate and establish a secret Context Transfer Key (CTK) with each ancestor node on its branch of the SWAN Topology Tree. An AP must also initiate path authentication whenever it detects a new SCM instance. A non-root AP must also initiate path authentication whenever it roams to a new parent AP. As an option, a non-root AP does not need to fully authenticate when it roams, if fast reauthentication is supported for child APs. Path authentication includes a Path-Init Request/Reply exchange and initial Registration Request/Reply exchange.

An Unattached AP sends a Path-Init Request to its selected parent node, on its selected primary port, to initiate path authentication. The Originator is the Unattached AP; the Requester is also the Unattached AP; and the Responder is the selected parent node (i.e. parent AP or SCM), in the Path-Init Request and the corresponding Reply.

The parent node forwards a Path-Init Request from an Unattached AP or CM inbound until it reaches the root CM. The parent node enters its Node ID in the Originator field and the Node ID of its parent CM in the Responder field, before forwarding the request inbound. An intermediate LCM updates the Responder field with the CCM Node ID before it forwards the request inbound to the CCM. The CCM returns a Path-Init Reply to the parent node (i.e. the Originator). The parent node updates the Responder field with the Requester Node ID before forwarding the Reply to the Unattached AP or CM.

An AP authenticates with the root CM before it can register with the SWAN infrastructure. An AP discovers the root CM via a parameter contained in SCM advertisement messages. The root CM may be the local SCM, an LCM, or the CCM.

An Unattached AP scans for a potential parent SCM or AP on each of its ports that are configured in child or parent/child mode. Note that an Attached AP becomes Unattached if it discovers a new instance of its parent AP or SCM. An Unattached AP or CM sends an initial Registration Request to its selected parent node, on its selected primary port, to request attachment to the network. The Originator is the Unattached AP; the Requester is also the Unattached AP; and the Responder is the selected parent node (i.e. parent AP or SCM), in the initial Registration Request and the corresponding reply.

SWAN Authentication and Privacy is achieved by enforcing SWAN infrastructure nodes to mutually authenticate with both the root CM (CCM) as well as the IN nodes it will communicate with. Protection of WLCCP messages is achieved by the CCM generating and distributing CTKs upon successful pre-registration of INs.

"Initial authentication" is based on the IEEE 802.1X protocol. Each "secure MN", AP, and CM must initially "mutually authenticate" with an 802.1X authenticator, via an external authentication server (e.g. a RADIUS server). Infrastructure nodes (APs, SCMs, and LCMs) mutually authenticate with an "IN Authenticator". "Secure MNs" mutually authenticate with a "MN Authenticator". While MNs can select from any supported 802.1X EAP authentication types, for initial releases, IN nodes shall authenticate using LEAP.

In a campus network, the SWAN CCM contains the IN Authenticator and LCMs or SCMs contain a MN Authenticator. In a stand-alone local domain, both the IN Authenticator and the MN Authenticator are contained in the LCM. In a stand-alone subnet domain, both the IN Authenticator and the MN Authenticator are contained in the SCM.

All nodes authenticate into the SWAN topology prior to registration. The node authenticator will cache the credentials upon successful 802.1X EAP authentication. For example, the IN authenticator caches WLCCP Node Identifier (e.g., an AP's MAC address, BSSID), NSK, CTK, Key Sequence Counter and MIC sequence counter. Similarly, the MN authenticator caches WLCCP Node identifier (MN's MAC address), type of authentication, key management data such as KRK, BTK, RN, Cipher, NSK as well as the currently associated AP (BSSID).

The fields in each registration entry are populated at either 802.1X EAP Authentication success or during a pre-registration. A successful authentication will result in the creation of a registration entry with the proper IDs, NSK and session timeout values defined. For MN, the valid BSSID, SSID and VLAN ID will also be defined at authentication based on the EAP identity.

802.1X EAP authentication messages are WLCCP encapsulated by the node's parent. An infrastructure node communicates directly via a wired link to the IN Authenticator during authentication. Once the IN parent has received the EAPOL authentication message, it will encapsulate it using a WLCCP_AAA message.

Since a MN communicates through the AP to the MN Authenticator the AP WLCCP encapsulates the EAP messages. Since the AP has authenticated and registered with the MN authenticator, WLCCP AAA messages can be optionally authenticated.

Each "secure" MN mutually authenticate with a MN 802.1X Authenticator via an external security server. In infrastructure mode, the MN authenticator can be an LCM. In SCM stand-alone mode, the MN authenticator is in the SCM.

A MN does not require knowledge of the infrastructure behind the AP. Thus, from the MN's view, MN authentication is done as specified by the wireless protocol, e.g., 802.11 (SSN and TGi) protocols as well as the use of CCKM. For an MN to be properly managed by the SWAN topology, it completes 802.1X EAP Authentication.

The MN employs 802.1X EAP Authentication to reap the benefits of LEAP, SSN or TGi's security advantages as well as SWAN manageability. In the SWAN architecture, the MN Authenticator is detached from the parent AP. When the MN engages in an 802.1X EAP authentication, its EAPOL messages are WLCCP encapsulated by the parent AP, in EAP-Authentication Request messages, and forwarded to the MN Authenticator.

Depending on the key management negotiated, the MN Authenticator must also properly forward the required keys to the AP in a Pre-registration Request/Reply exchange.

The pairwise transient keys (PTKs) used to protect communications between the MN and AP are generated by the MN and AP in all key management schemes.

The AS must also accommodate the session timeout setting based on key management approaches. For LEAP, the session timeout remains a function of the 802.11 negotiated cipher suite. However, for either SSN/TGi and CCKM, the session timeout is a function of the mutually derived key of each EAP authentication type.

After a CCKM MN has successfully authenticated, the MN Authenticator must trigger a key initialization to establish the Key Request Key (KRK) and Base Transient Key (BTK) before the MN and associated AP can establish PTKs. To trigger KRK and BTK derivation, the MN Authenticator must generate a 16-byte nonce. An EAPOL Key message of the format described in the current TGi Draft [6] is generated to send the nonce to the MN and thus initiate the 4-way handshake used to establish KRK and BTK. The EAPOL Key message is encapsulated in a WLCCP_AAA message and delivered to the MN. The delivery is is through the AP, thus the AP will unencapsulate the WLCCP message and forward the EAPOL Key message to the MN. The handshake proceeds as described in the Fast Handoff using Cisco's Central Key Management Protocol Specification.

After a CCKM MN has successfully authenticated, the MN Authenticator must trigger a key initialization to establish the Key Request Key (KRK) and Base Transient Key (BTK) before the MN and associated AP can establish PTKs.

To trigger KRK and BTK derivation, the MN Authenticator must generate a 16-byte nonce. An EAPOL Key message of the format described in the current TGi Draft [6] is generated to send the nonce to the MN and thus initiate the 4-way handshake used to establish KRK and BTK. The EAPOL Key message is encapsulated in a WLCCP_AAA message and delivered to the MN. The delivery is through the AP, thus the AP will unencapsulate the WLCCP message and forward the EAPOL Key message to the MN. The handshake proceeds as described in the Fast Handoff using Cisco's Central Key Management Protocol Specification.

An infrastructure node must first authenticate with the IN Authenticator using 802.1X EAP Authentication to establish a secret network session key (NSK). For initial releases, LEAP will be the authentication type. Since LEAP is known to be susceptible to dictionary attacks, as well as good security practice, a CTK must also be mutually derived to protect data exchanged between the IN and IN Authenticator.

An authenticating "supplicant" IN exchanges EAPOL authentication messages with its parent AP or CM. The supplicant's parent AP or CM relays the EAPOL authentication messages between the supplicant and the IN Authenticator in the root CM The EAPOL authentication messages are encapsulated in WLCCP AAA Message Request and Reply messages, with one exception. A child AP must exchange raw EAPOL messages with its parent AP on an 802.11 link.

The IN Authenticator contains a RADIUS client, which converts EAP Authentication Request messages to RADIUS request messages, and converts RADIUS response messages to AAA Message Replies. The IN Authenticator determines if the authentication process has failed based on the RADIUS messages received.

A secret "session key", NSK, is established during initial authentication. The NSK is then used by the IN and IA along with exchanged key material to mutually derive the CTK. The CTK protecting TLVs and messages between the IN and IA are the only CTKs that require mutual derivation, all other links CTKs are derived through a strong pseudorandom function by the IA and delivered to the Ins.

An SCM or LCM determines that it must initially authenticate with the IN Authenticator in the CCM if it is configured with the IP address of the CCM. All infrastructure nodes must also initiate "path authentication", after a successful LEAP authentication, to mutually authenticate and establish a CTK with each of its ancestors.

When in standalone mode, the SCM acts as both the MN and IN Authenticator. A path initialization message with only a single Secure Context TLV is required as it only requires the direct CTK with the IN Authenticator (e.g. the SCM). Since this is the only present link the Path Initialization message only requires a 3-way handshake: request, reply and confirm. However, to keep consistent with a full topology infrastructure, in the SCM standalone configuration, the AP shall use a request/reply handshake for Path Initialization and confirm the key establishment through the use of the Authenticator TLV in the Registration request/reply exchange.

Figure 12:
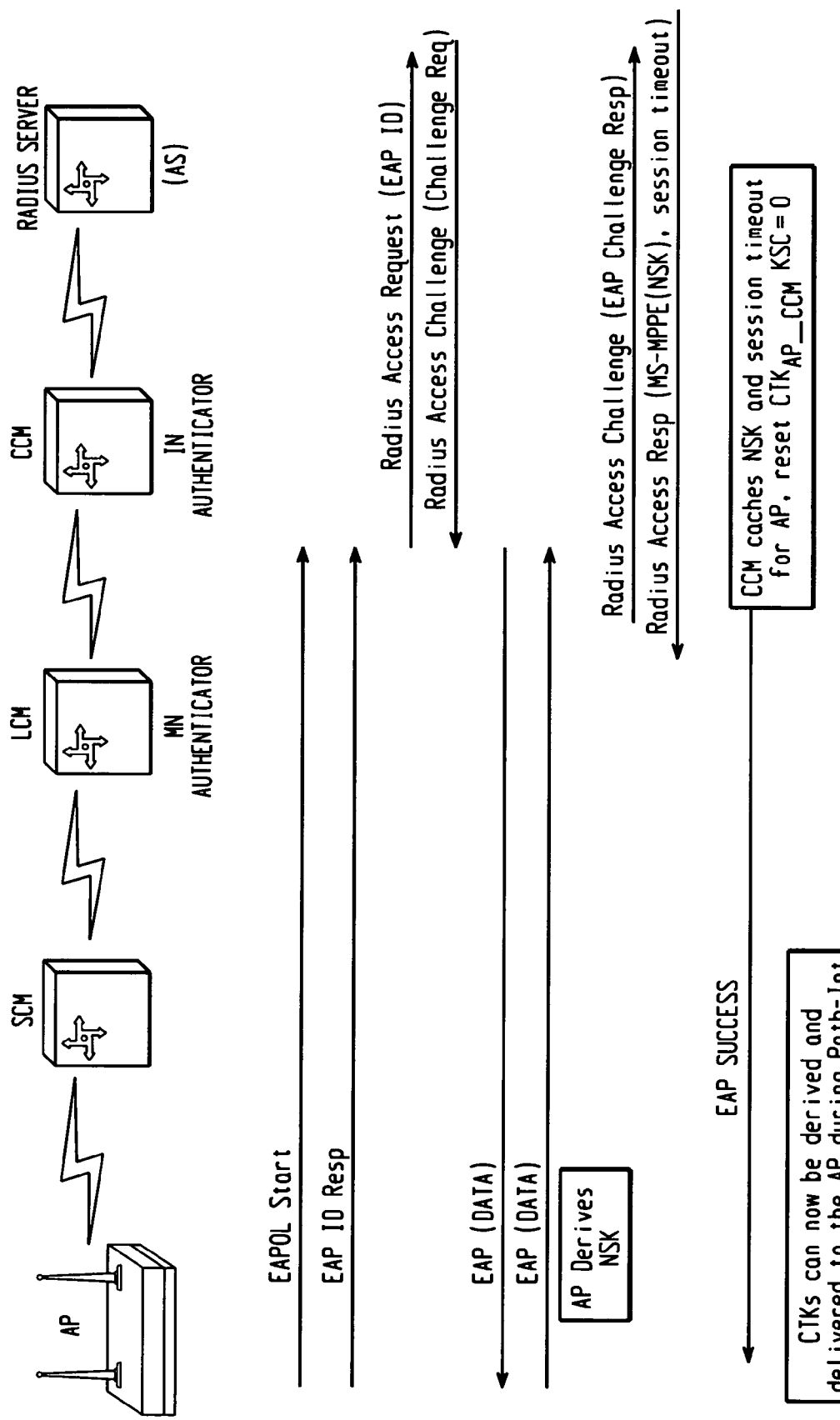
FIG. 12 is an example of a root access point authentication.

However, in a full SWAN topology, a full 4-message handshake is required to establish both the key delivery and liveness confirmation between the supplicant IN and its ancestors. The request/reply messages are required for key delivery and the confirm/ack are required to prove each link is live. FIG. 12 gives an example of a root AP authentication. While the example demonstrates the root AP authentication and CTK establishment, the same steps are required for all other infrastructure nodes, e.g. LCM and SCM.

After an infrastructure node has initially authenticated, it must mutually authenticate and establish a separate secret a "Context Transfer Key" (CTK) with each of its ancestor nodes including the IA. A Path-Init message is used to establish CTKs between the supplicant IN and its ancestors. Each ancestor node provides a 16-byte nonce to allow for the distribution of fresh CTKs. The IA serves as a trusted key distribution center (KDC) for that purpose. The CTKs are used to generate MICs and encrypt sensitive context information in messages that are forwarded on branches of the Topology Tree. Preferably, CTKs are 256-bit values whose lower 128 bits are used to authenticate messages and TLV and whose upper 128 bits are used to encrypt messages and TLVs.

For the CTK used between the IN and the IA, the supplicant IN provides a 16-byte nonce in the Path-Init request message so that the IA can derive the CTK. The IA provides its 16-byte nonce in the Path-Init reply message so that the IN can derive the CTK. A final Path-Init confirm message is needed to allow the IN to confirm proper receipt of key material and liveness of the CTK. If a full path authentication is requested by the use of a TLV, a fourth message is required to establish liveness of the CTK distributed in the Path-Init request/reply exchange.

An unregistered and unauthenticated IN "supplicant" initiates Path Authentication by sending a Path-Init Request message and embeds a WTLV_INIT_SESSION to its selected parent node. Included in the Init Session TLV is a Secure Context TLV that includes the IN's 16-byte nonce directed to the IA (e.g. the DST-ID is the IA in the Secure Context TLV). The parent node forwards the Path-Init Request inbound to the root CM, which contains the IA. Each node on the path to the root CM, including the parent node, inserts a Secure Context TLV into the request message's Init Session TLV. The IN Authenticator in the root CM determines the supplicant's list of ancestors from the list of TLVs when it receives the Path-Init Request.

The IA will mutually derive the CTK to protect the link between the requesting IN and the IA. Additionally, the IA will generate CTKs for each of the supplicant's ancestors. The IA must first derive the CTK protecting the IN-IA link so that it can generate the Transient Key TLVs to properly deliver the CTKs to the requesting IN. For all of the ancestors, the CTKs are embedded in the corresponding (and now encrypted) Secure Context TLVs. For the Secure Context TLV corresponding to the IN-IA link, the nonce generated by the IA is included in the TLV and a new MIC is computed using the newly established $CTK_{IN-IA}$. This MIC within the Secure Context TLV serves as the liveness authenticator to the requesting IN.

Figure 13:
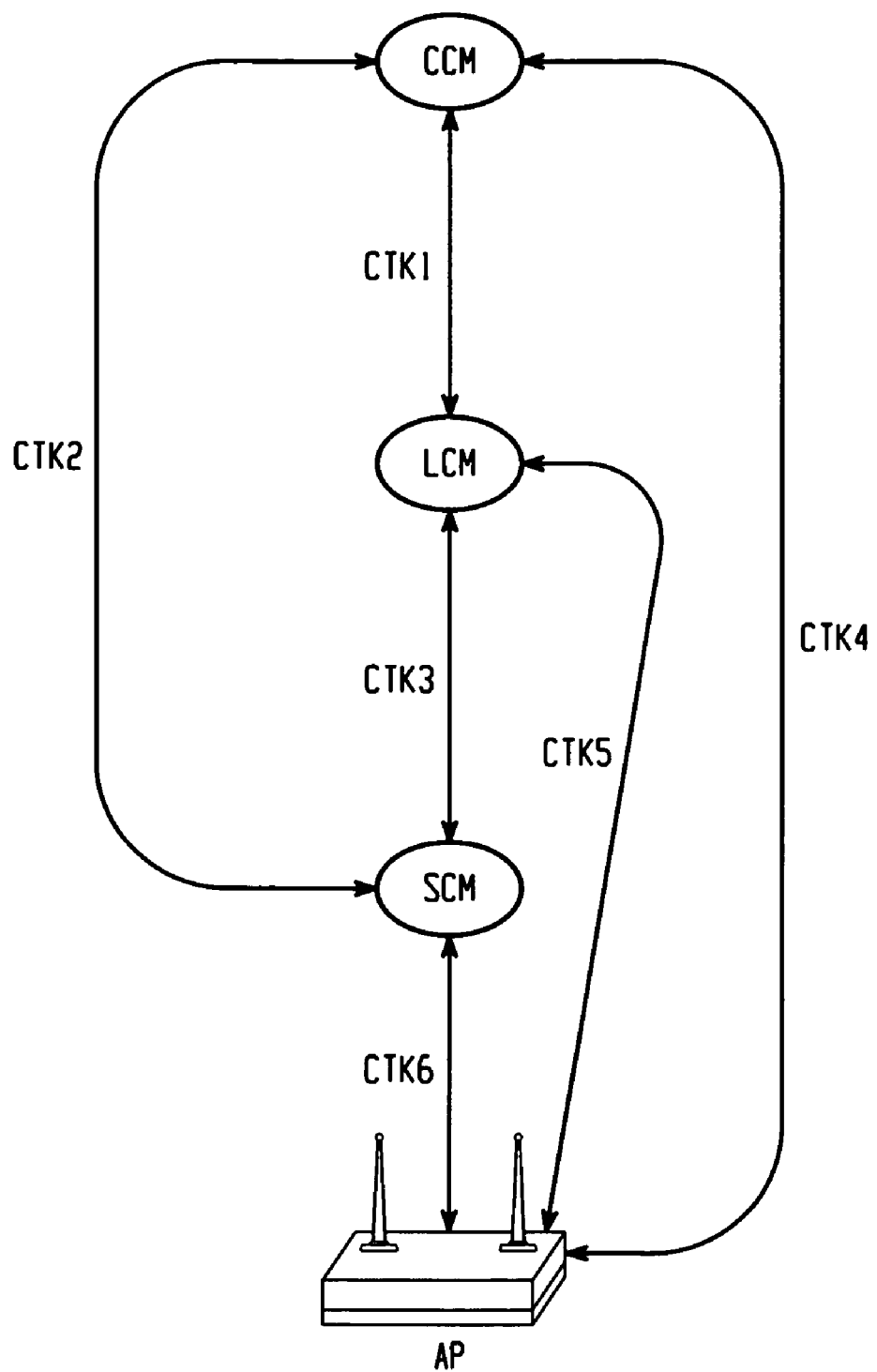
FIG. 13 is a block diagram illustrating defined CTK's.

To better describe the actions required to authenticate a IN to the SWAN topology, a simplified terminology is defined. First, the set of CTK's are explicitly defined in FIG. 13.

The AP path authentication are as follows:
An NSK is shared between the AP and the CCM
It is presumed the AP's ancestors have successfully registered. In the example shown in FIG. 13, CTK1, CTK2 and CTK3 are fresh and valid. This is a requirement as CTK1 is used to deliver and authenticate delivery of CTK5 to the LCM. While CTK2 is used to deliver CTK6 to the SCM but is sent via the LCM. The LCM in turn protects the context reply using CTK3.

Figure 14:
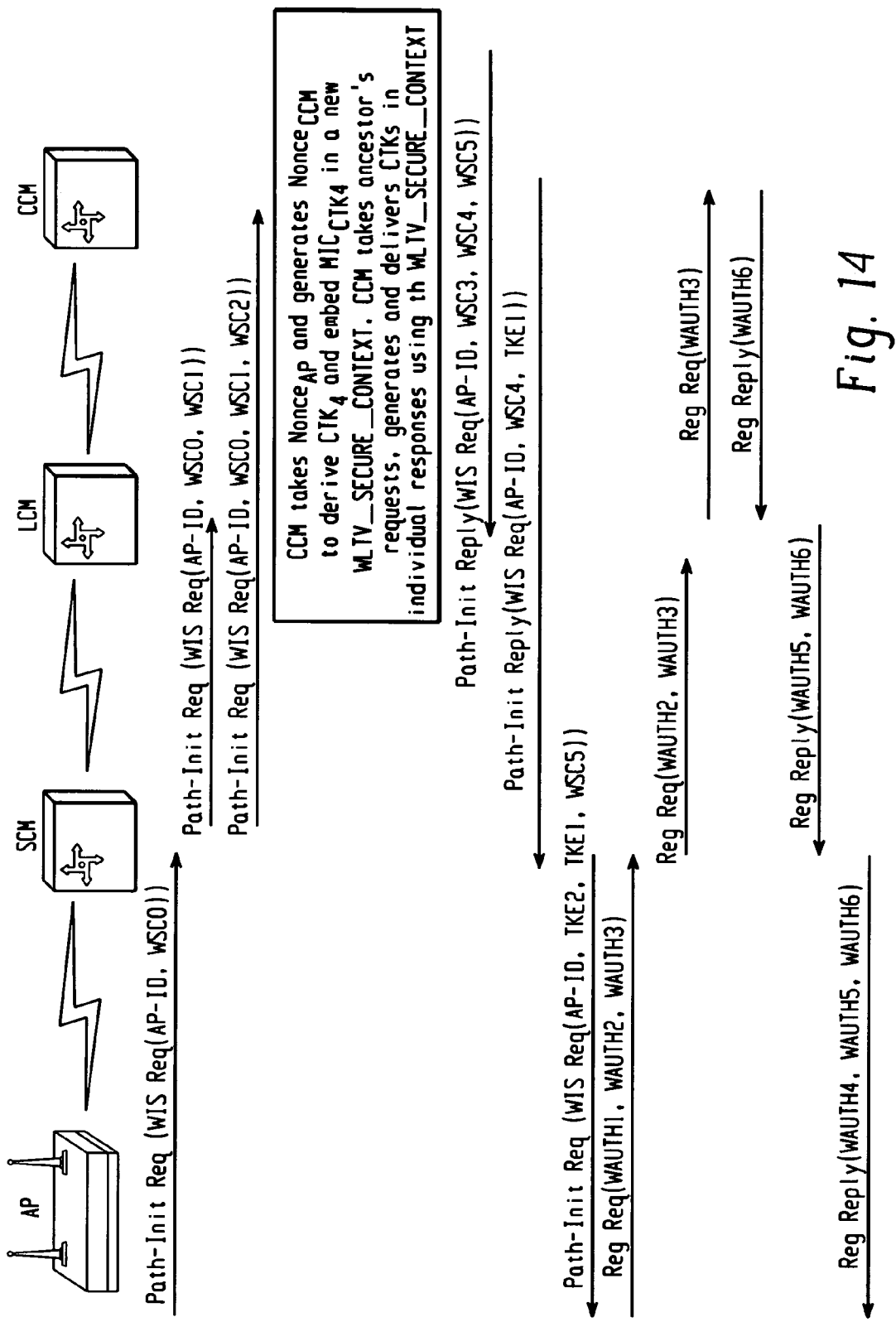
FIG. 14 is an example block diagram of an AP authenticating and registering to the infrastructure.
Figure 15:
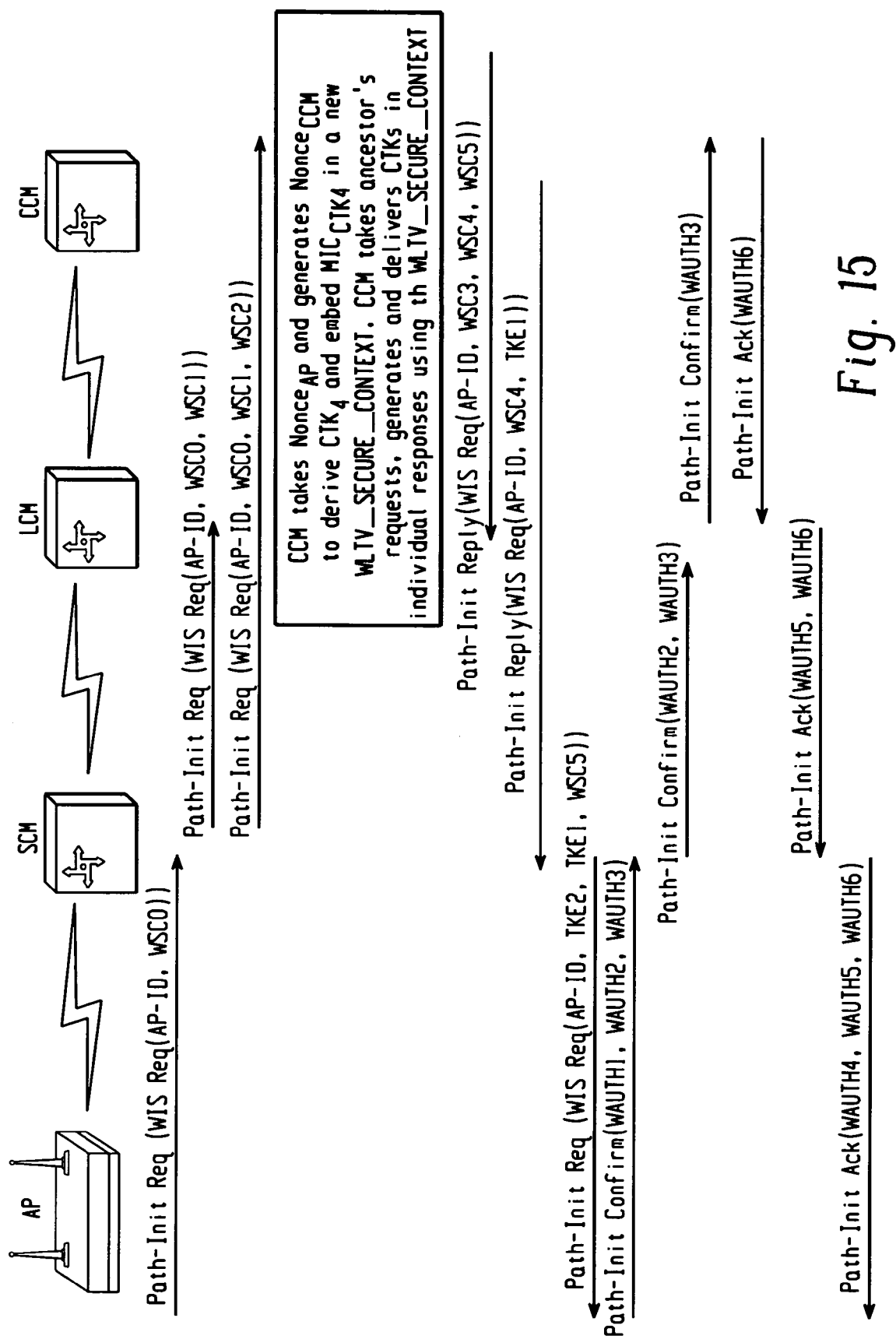
FIG. 15 is an example block diagram of an alternate sequence used for a path update requiring no registration.

An example of an AP authenticating and registering to the infrastructure is depicted in FIG. 14. An alternate sequence for when paths need to be updated but no registration is required is shown in FIG. 15.

Each CTK delivered to the supplicant is encoded in by a TLV. The CTK is directly delivered to the supplicant's ancestor by a TLV. The list of TLVs is then entered into the Path-Init Reply message, which is sent to the supplicant's parent node. The parent node relays the Reply to the supplicant. Each node on the outbound path of the Path-Init Reply decrypts the CTK that it shares with the supplicant when it receives its respective TLV. As shown in FIG. 15, once the supplicant receives the Path-Init Reply message, it sends an "initial" Registration Request message to the root CM, via its parent node, as described above. The supplicant enters a TLV into the request message for each of its ancestor nodes. Each ancestor node "authenticates" the supplicant when it receives its TLV; therefore, the supplicant is fully authenticated before a Registration Reply is generated. Each ancestor node must update and re-encrypt the TLV before forwarding the Registration Request. The supplicant mutually authenticates each of its ancestor nodes when it receives the updated list of TLVs in the Registration Reply.

Figure 16:
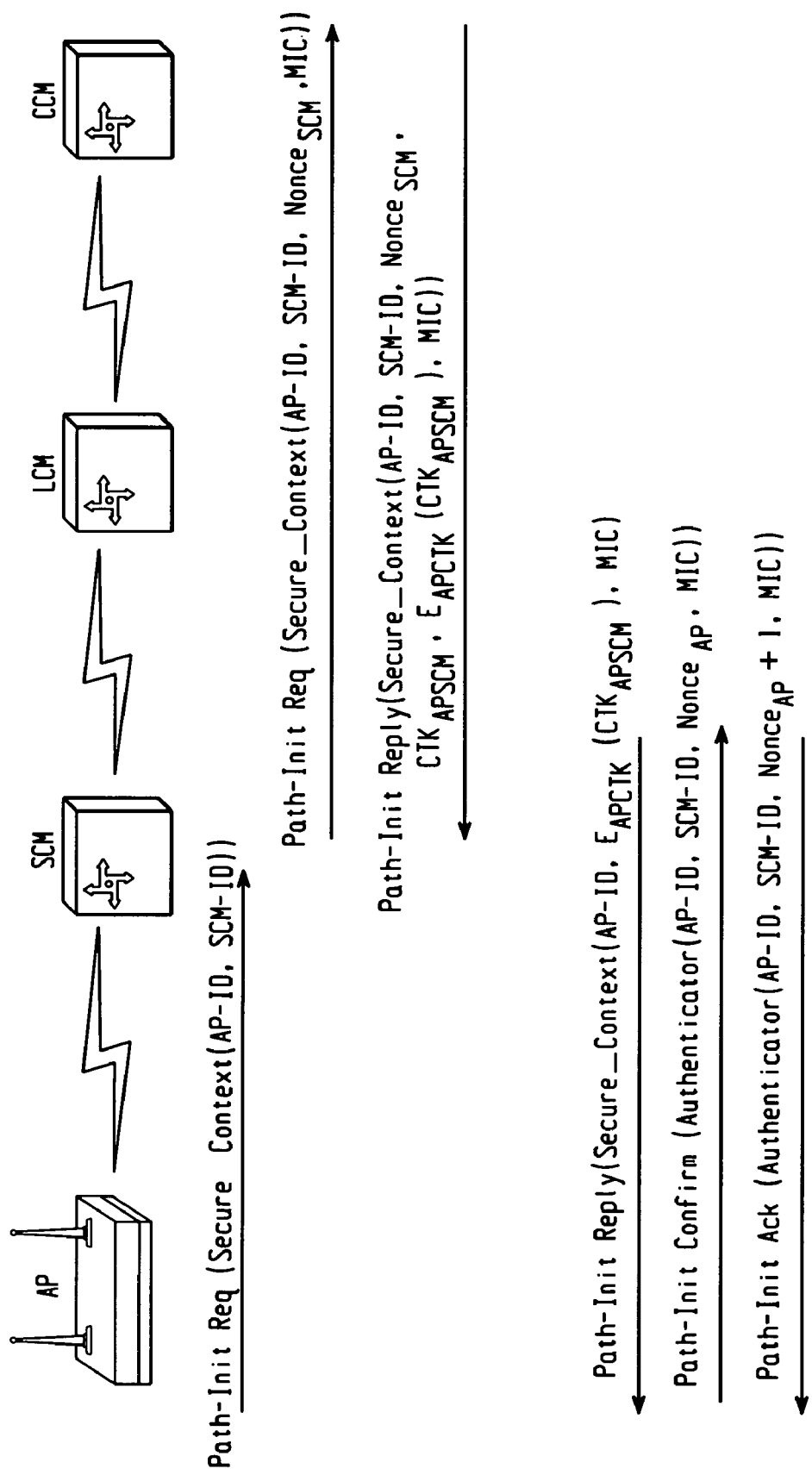
FIG. 16 is an example of an Establish (refresh) CTK's between an access point and a subnet context manager.

CTKs can be similarly refreshed as shown in FIG. 16, with the only difference being that no registration is needed and thus, rather than using a Registration message type, it extends the Path-Init message to use subtypes Confirm and ACK.

The CTKs are refreshed based on the entropy defined by the cipher suites used to provide privacy and authenticity. CTKs are refreshed when the message sequence counter has been exhausted or at a predetermined frequency, typically no more than a couple times a day (a 6 hr. interval will be reasonable). However, if a node is experiencing frequent MIC and or decryption failures it should silently discard these messages. Optionally, the IN can decide whether to trigger a CTK refresh or a full (re)authentication.

CTK refreshes can optionally be refreshed for an entire branch, or a single CTK can be refreshed using a Secure Context request/reply exchange. While the CTK used between the infrastructure node and the IA is also established and refreshed, its key is not be directly delivered by the IA, but rather key material (e.g. nonces) are exchanged to mutually derive a CTK.

To rekey or establish a single CTK, the supplicant IN must request the IA for a fresh key. A 2-phase exchange is required. In the first phase, a TLV is used to establish the CTK. In the second phase a TLV is used to confirm liveness of the CTK. The first phase is done during a Path-Init Request/Reply exchange while the second phase is completed during initial registration. The second phase ensures CTK liveness between the link nodes.

FIG. 16 is an example of how a CTK used to protect the link between the AP and SCM employs the CCM for key delivery and direct path authentication from AP to SCM to confirm liveness of the CTK.

Dynamic security credentials for a MN are established in the initial MN authentication process, described above. These credentials include: NSK, session timeout, VLAN ID, SSID, KRK, BTK and RN. A MN's cached configuration information and dynamic credentials are automatically transferred to the new parent AP when a MN roams. The cached configuration information and dynamic credentials are also forwarded to any new SCM on the new path so that future roaming is localized (i.e. so that the LCM is not accessed as the MN roams within the subnet). The dynamic credentials are forwarded to the SCM during SCM registration updates.

The LCM can act as the MN Authenticator in a large, campus network topology. However, the location of the MN Authenticator can present longer latencies and thus it is desirable to forward the MN's security credentials down to the SCM. The forwarding of the credentials is achieved during Registration request/reply. This allows the MN's infrastructure ancestors, mainly the SCM, to cache the MN's security credentials and facilitate roaming.

Figure 17A:
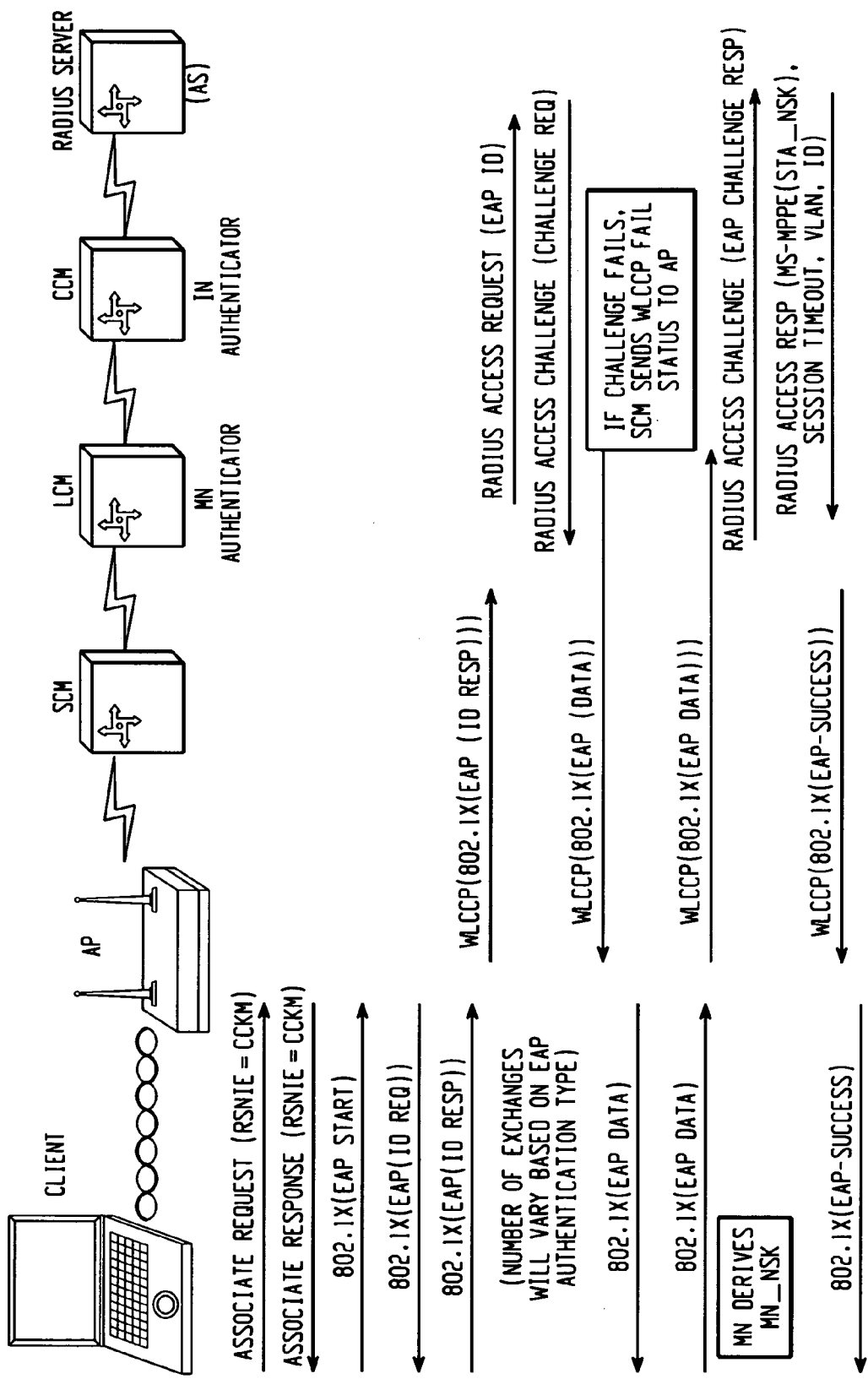
FIG. 17 is a block diagram illustrating an example message sequence for a successful mobile node authentication and registration to campus network topology.
Figure 17B:
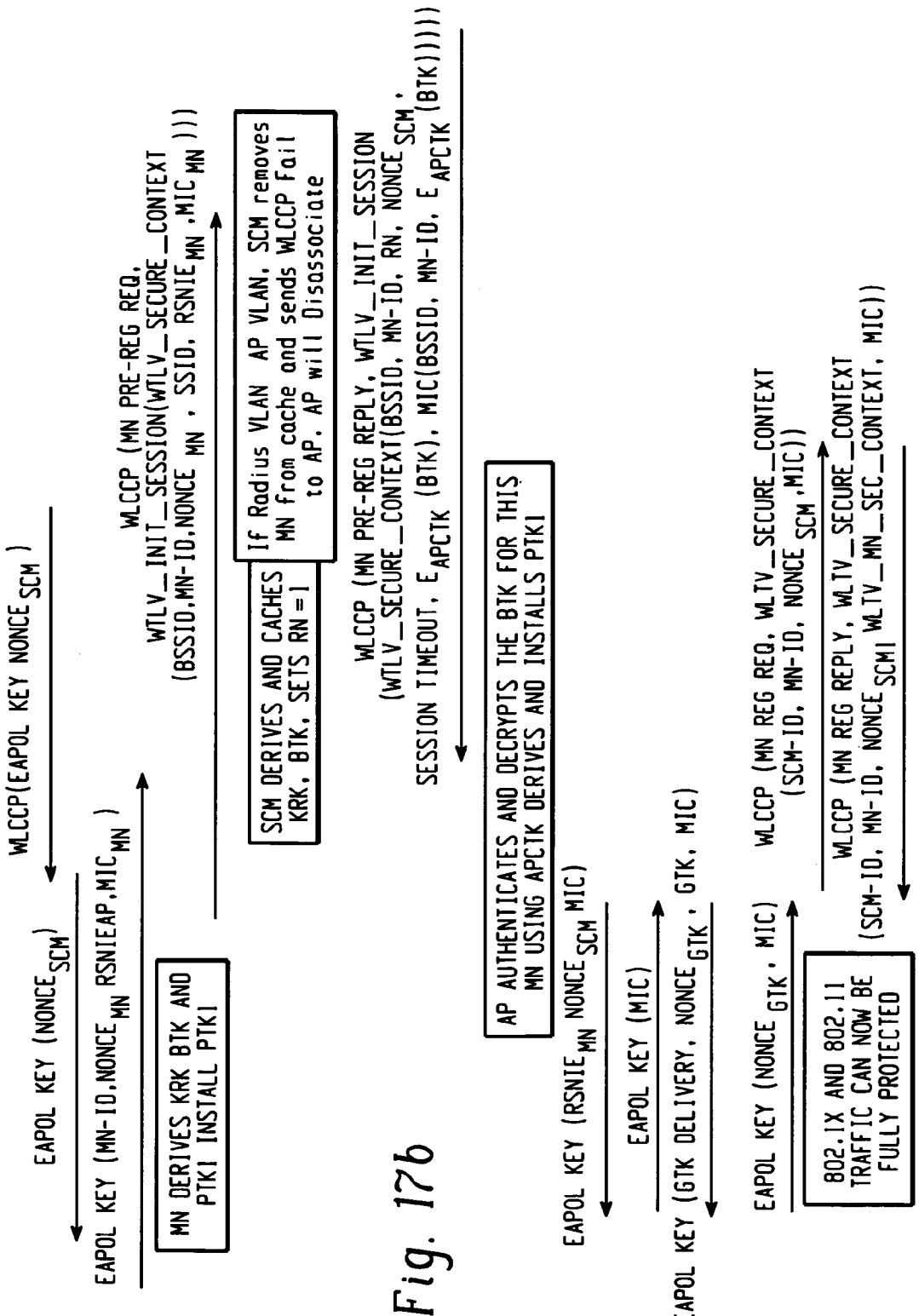

The credentials are forwarded by request. That is, during a MN Registration Request, each ancestor (excluding the AP) can insert a request that the MN credentials be forwarded, a MIC must be included in the Secure Context TLV for the MN Authenticator to validate. On a successful request, the MN Authenticator will then embed a TLV that includes all of the cached credentials encrypted in the TLV. Like the request, the Secure Context TLV must be MIC'ed on a reply as well. A full depiction of an MN authentication and registration under a SWAN topology is shown in FIG. 17.

A "lateral" Context Request or Context Reply message is forwarded independent of the SWAN Topology Tree. For example, the Originator and Responder may not be on the same Topology Tree branch; therefore, the Originator and Responder may not share a secret CTK. The Inbound and Outbound flags are set OFF in a lateral Context message.

A "Lateral-CTK" (L-CTK) shared by the Originator and Responder of a lateral Context message is used to authenticate the message and to encrypt any sensitive TLVs contained in the message. A common ancestor of the Originator and Responder functions as a trusted third party to generate a L-CTKL-CTK. The common ancestor uses the path CTK it shares with the Originator and the path CTK it shares with the Responder to securely deliver the L-CTKL-CTK to each node.

The common ancestor generates a "ticket" and a L-CTK. The L-CTK is encrypted with the path CTK shared by the common ancestor and the Originator.

The ticket also contains the L-CTK and is encrypted with the path CTK shared by the common ancestor and the Responder. The L-CTK and ticket are delivered to the context transfer Originator in a TLV.

The Originator includes the Node ID of the common ancestor, the ticket and an "authenticator" in a TLV in the lateral Context Request sent to the Responder.

The Originator uses the L-CTK to generate the TLV used to authenticate the Context Request. The Responder decrypts the ticket with the path CTK it shares with the common ancestor and extracts the L-CTK. The Responder can then use the L-CTK to authenticate the message and to decrypt any encrypted TLVs. The Responder also uses the CTK to authenticate the Reply message and to encrypt any sensitive TLVs contained in the Reply.

The root CM is the common ancestor of all SWAN nodes; therefore, the root CM can establish a L-CTK for any two nodes. An Originator node can send a TLV, in a Context Request message, to the root CM to request a L-CTK and ticket for a second Responder node. The root CM returns the ticket and the L-CTK in a TLV in the Context Reply message.

If a MN roams from an old AP to a new AP it may be necessary to forward context information laterally from the old AP to the new AP, in a Context Request message. The nearest common ancestor CM can automatically deliver a L-CTK and a "ticket" for the new AP in the Deregistration Request message sent to the old AP. The old AP can use the L-CTK to generate a TLV and to encrypt any sensitive context information in the Context Request sent to the new AP, as described herein supra. A similar mechanism can be used to transfer context laterally from the "old LCM" to the "new LCM" when a MN roams to a new local control domain.

Figure 18:
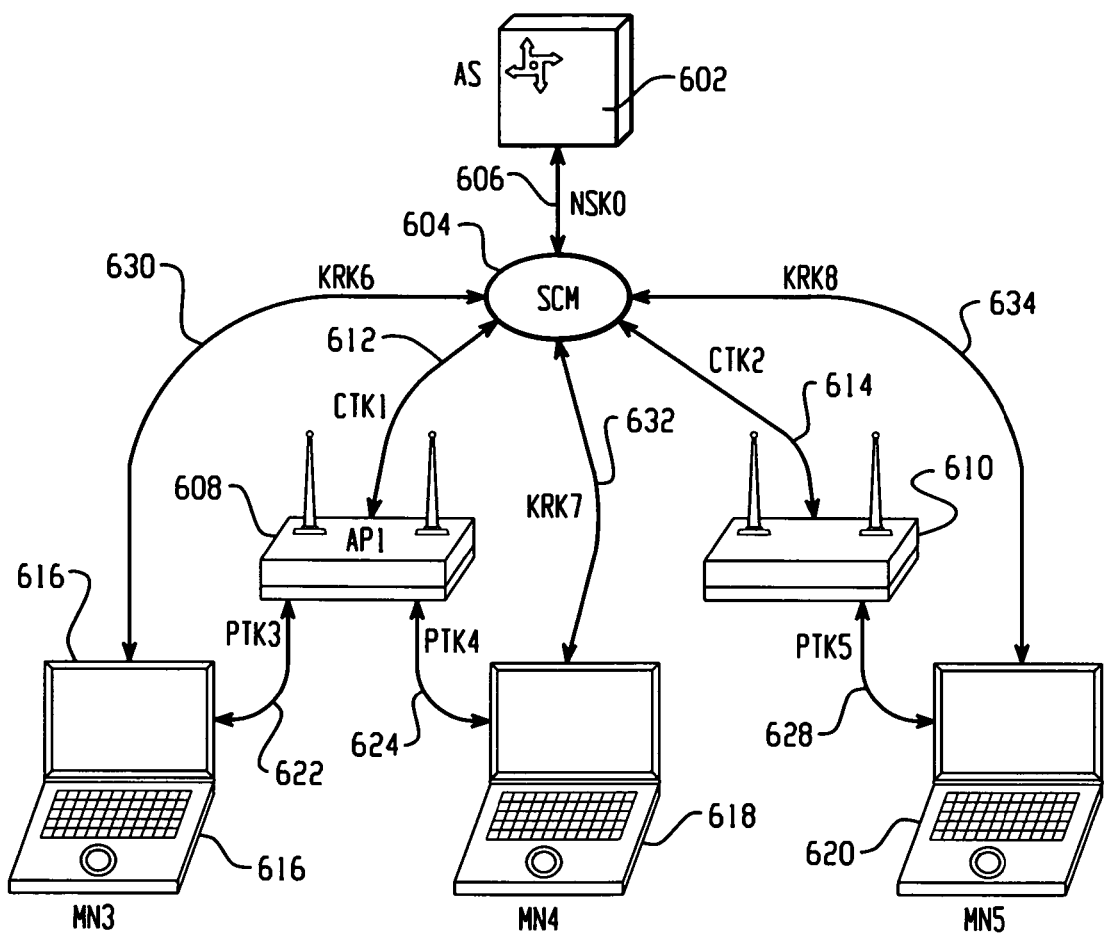
FIG. 18 is an example of a single subnet implementation.
Figure 19:
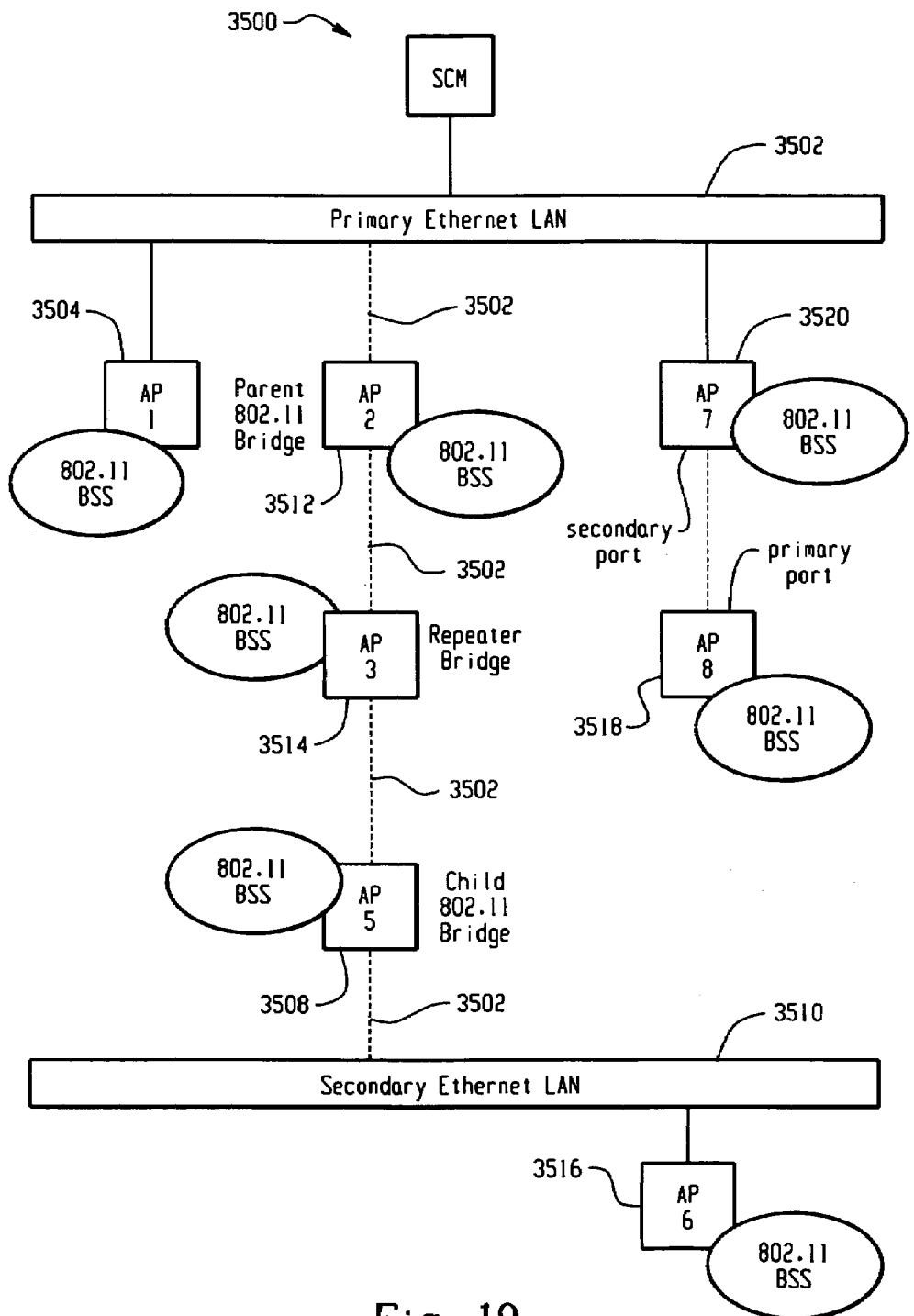
FIG. 19 is a block diagram of an exemplary WLAN spanning tree for a single subnet.

FIG. 18 is an example of a single subnet implementation and shows the keys used to protect communication between assigned links. Note that BTKs are not used to protect messages directly; rather, it is used to derive PTKs used to protect communications between AP and MN. As shown in FIG. 18, the AS 602 uses NSKO 606 to communicate with the SCM 604. The SCM 604 communicates with AP1 608 and AP2 610 using keys CTK1 612 and CTK2 614 respectively. AP1 608 communicates with MN3 616 and MN4 618 using PTK3 622 and PTK4 624 respectively, while AP2 610 communicates with MN5 with PTK5 628. The SCM 604 may also directly communicate with the mobile nodes, MN3 616, MN4 618 and MN5 620 using KRK6 630, KRK7 632 and KRK8 634 respectively.

SCM 604 is operated in standalone mode and WLCCP is not used to update Layer 2 forwarding paths. SCM 604 is the 802.1X Authenticator for MNs 616, 618, 620 and APs 608, 610. EAPOL messages are relayed between SCM 604 and parent APs in WLCCP AAA messages.

The simple implementation does not support Layer 2 path updates, inter-subnet handoffs, or inter-subnet context transfer. The network topology does not include a CCM or LCMs. The existing Cisco DDP protocol, available from Cisco Systems, Inc., 170 West Tasman Drive, San Jose, Calif. 95134, can be used to establish and delete layer-2 forwarding paths. DDP is also used for intra-subnet handoffs (i.e. when stations roam within a single subnet). The SCM is the IN and MN 802.1X authenticator; therefore, it maintains an Authenticated Node Table.

Each AP 608, 610 mutually authenticates with the 802.1X Infrastructure Authenticator, which is the active SCM 604 in the simple WLCCP implementation. SCM 604 advertises its IP address in a TLV in SCM_Advertisement Reply messages. WLCCP IP-encapsulated Context Request and Reply messages are used to transport EAPOL authentication messages between the "Supplicant" AP and the 802.1X Authenticator. The AP/SCM mutual authentication process establishes a Network Session Key (NSK) that is shared by the Supplicant AP and the SCM. An AP initiates Path Authentication with the SCM after it has successfully authenticated (and whenever it roams). The NSK is used in the Path Authentication process (described herein infra) to establish an AP-SCM Context Transfer Key (CTK).

SCM 604 maintains a Registration Table, which has an entry for each AP 608, 610 in its subnet and each MN 616, 618, 620 associated with APs 608, 610. The Registration Table is initialized to 'empty'. SCM 604 resets the table to empty whenever it relinquishes active SCM status. In the simple WLCCP implementation, the Registration Table is used to manage MN context information. It does not contain Layer 2 forwarding information and Path State information.

The SCM creates or updates a Registration Record for an AP or MN when it receives a valid Registration Request and generates a corresponding Registration Reply for the AP or MN.

In the simple WLCCP implementation, Preregistration and Registration Messages are authenticated with an SCM/AP CTK established via AP Path Authentication. The CTK is used to generate and check a Message Integrity Check contained in a TLV in all (Pre)Registration messages. SCM 604 always uses the CTK it shares with the Originator to authenticate (Pre)Registration Request messages. An AP 608, 610 uses the CTK it shares with SCM 604 (i.e. the Responder) to authenticate (Pre)Registration Reply messages. (Pre)Registration messages generated by a non-root AP are not processed or authenticated by intermediate APs, in the simple WLCCP implementation.

When SCM 604 receives an "invalid" (Pre)Registration Request, which fails message integrity authentication, SCM 604 returns a Reply message, with a "Bad MIC" status, without further processing the message.

An AP, such as AP 608 and/or 610, authenticates its path to SCM 604, as described below, to establish and update a Context Transfer Key (CTK) that is shared with SCM 604. SCM 604 generates a Path-Init Reply when it receives a Path-Init Request with the Response-Req Flag set ON. SCM 604 returns a Path-Init Reply with a 'good' status if it has an Authenticated Node Entry, for the Requestor AP, that is in the 'authenticated', 'preregistered', or 'registered' state; otherwise, SCM 604 returns a Path-Init Reply with an 'unauthenticated' status.

Path authentication, including AP/SCM CTK generation and distribution, is described in detail in the section entitled "Infrastructure Path Authentication".

Single Subnet Network—Received AP Registration Request

An AP, which has successfully completed path authentication, registers with SCM 604, as described herein infra. SCM 604 generates a Registration Reply for an AP when it receives a Registration Request from the AP with the Response-Req Flag set ON. SCM 604 returns a Registration Reply with a 'good' status if it has an Authenticated Node Entry, for the Requestor AP that is in the 'preregistered' or 'registered' state; otherwise, SCM 604 returns a Registration Reply with an 'unauthenticated' status. SCM 604 creates or updates an AP Registration Record for the Originator, when it generates a Registration Reply with a 'good' status. The age of the Registration Record is reset to '0' when a good Reply is generated.

A new parent AP sends a Preregistration Request to SCM 604, with the Response-Req Flag set ON, to obtain the dynamic security credentials of a child MN when it reassociates. SCM 604 generates a Preregistration Reply for a MN when it receives the Preregistration Request. SCM 604 returns a Reply with a 'good' status if has an Authenticated Node Entry for the MN.

SCM 604 generates a Registration Reply for a MN when it receives a Registration Request from a MN's parent AP with the Response-Req Flag set ON. SCM 604 returns a Registration Reply with a 'good' status if 1) it has an Authenticated Node Entry, with a 'successful' status, for the Requestor MN and 2) it has a 'bound' Registration Record for the Originator AP. SCM 604 returns a Registration Reply with an 'unauthenticated' status if the MN is not authenticated. SCM 604 returns a Registration Reply with an 'unregistered parent' status if the parent AP does not have a bound Registration Record.

SCM 604 accepts Registration Requests in order of arrival. As an option, SCM 604 should timestamp a MN Registration Record each time a 'good' Registration Reply is generated for the respective MN. The timestamp is calculated using the current time minus any Delay value in the corresponding Registration Request. SCM 604 should discard a received Registration Request for a MN if there is an existing Registration Record for the MN and the timestamp value in the entry is greater than the current time minus any Delay value in the Registration Request.

In the simple WLCCP implementation, SCM 604 does not generate a Deregistration Request when a MN roams to a different parent AP.

The simple WLCCP implementation requires the following AP procedures. An AP 608, 610 processes SCM-Advertisement Reply messages to discover the active SCM. AP 608, 610 mutually authenticates with the 802.1X IN Authenticator, and establishes an NSK. Each AP 608, 610 authenticates its path to SCM 604 to establish a CTK. Each AP 608, 610 registers with SCM 604.

Registered APs must generate SCM Advertisement Reply messages on secondary ports. Registered APs preregister MNs to obtain MN dynamic credentials. Registered APs register MNs. Preregistration and Registration messages are sent with the Hopwise-Routing Flag set OFF; therefore, intermediate APs do not process the messages.

An AP 608, 610 must monitor SCM Advertisement Reply messages received on its primary port on the native VLAN to determine if there is an active SCM for the native VLAN. An AP 608, 610 executes the simple WLCCP protocol if there is an active SCM for the AP's native VLAN.

The MN 802.1X Authenticator is in SCM 604 when the AP 608, 610 is registered with the active SCM; otherwise, the MN 802.1X Authenticator is in the AP 608, 610. Path cost and hop count information do not need to be used in the simple implementation. SCM 604 Advertisement protocol is not necessary to determine the AP primary port.

An AP 608, 610 must initiate Path Authentication with SCM 604, after it has successfully authenticated, to establish a secret Context Transfer Key (CTK) that is shared by the AP 608, 610 and SCM 604. An AP must periodically update its AP-SCM CTK via update Registration Request/Reply messages.

Preferably, the root CM is SCM 604, and) the Hopwise-Routing Flag is set OFF in the simple implementation. The Hopwise-Routing Flag is set OFF because Layer 2 Path Updating is not enabled; therefore, it is not necessary to establish a shared CTK between a child AP and any ancestor APs.

An AP cannot generate Proxy Preregistration and Registration messages for MNs until it has successfully registered with SCM 604. An AP that is successfully registered with the active SCM (604) periodically generates SCM Advertisement Reply messages on each of its secondary ports. A timer is started initially when the AP has successfully registered with the active SCM. The timer is restarted each time it expires, until the AP transitions to an unregistered state (i.e. when the active SCM changes or is lost). The period of timer is set to SCM 604's advertisement period value. SCM 604's advertisement period is updated each time the AP receives an SCM Advertisement from the active SCM. A registered AP disables WLCCP when SCM 604's advertisement timer expires:

In the simple, single subnet WLCCP implementation, the WLCCP registration process is not used to establish or delete Layer 2 forwarding paths. The Originator is always the parent AP and the Responder is always the parent SCM. A Registration Request for a MN must contain the MN's SSID and the default VLAN ID for the MN.

SCM 604 acknowledges a Registration Request by returning a Registration Reply to the Originator. The Status value in the Reply indicates if the Registration Request was accepted.

If a parent AP does not receive an expected Registration Reply, then it retransmits the Registration Request, with the Retry Flag set ON and the same Message ID, until the number of retries equals a predetermined retry limit. The Delay field should be set to the elapsed time since the MN last transmitted an uplink frame, in a retransmitted Registration Request.

The Registration Reply Lifetime field contains a registration lifetime value, in minutes. An AP must generate an update Registration Request, for a MN, before the registration lifetime expires.

A Registration Request, which is generated for an 802.11 station that "reassociated", contains the BSSID of the old AP in a TLV. The BSSID is obtained from the "old AP" field in the 802.11 Reassociation Request transmitted by the station.

A Registration Reply message for a MN contains the MN's IP address, if it is known. A parent AP generates a "Registration Request for a MN when it first detects a new or different IP address for the MN (e.g., by snooping IP/ARP packets transmitted by the MN). A request is made to cause an update on the full path to the root CM.

Referring again to FIG. 1, there is illustrated an example of a multiple subnet WLCCP implementation. The full WLCCP implementation supports inter-subnet Context Transfer, reliable Layer 2 path updates, and subnets that include repeater AP's, simple wireless bridges (WGBs), and an arbitrary mix of Ethernet and 802.11 links.

As noted herein supra, a path lies on a branch of the SWAN Topology Tree. The full path to a node in a campus network includes the node, the CCM, and any intermediate nodes and links. A Path Instance is a full or partial path, at a point in time. Each CM establishes path instances for each node within its domain. For example, an SCM establishes an "SCM path instance" for each AP and MN in its subnet domain; the CCM establishes a "CCM path instance" for each CM, AP, and MN in the campus network. A path instance is established when an unattached node selects a parent node and registers with the SWAN infrastructure.

A CM path instance is identified by a Path ID, which is allocated by the respective CM. A Path ID of '0' is used to indicate "no Path ID". Valid Path IDs start at '1'. A CM increments its Path ID for a node when it receives an "initial" Registration Request message for the node. Registration Reply, "update" Registration Request, Detach, Deregistration, Path Update, and Path Check messages always contain a valid Path ID.

An SCM path instance exists within the context of an LCM path instance. An LCM path instance exists within the context of a CCM path instance. The combined CCM, LCM, and SCM Path IDs identify the full path instance for a MN in a campus network. In FIG. 1, for example, the full path instance for MN-2 is identified by Path IDs 15, 10, and 6, which were established by the CCM 1702, LCM 1706, and SCM 1712 respectively.

An "inbound path" is defined by the structure of the Topology Tree. An "outbound path" to a node is defined by state information maintained in each CM and AP on the path to the node. The path state information for a single descendant node is contained in a "Descendant Path Record" (DPR) in each CM and AP on the outbound path to the node.

No disconnected path fragments can exist in the Topology Tree. A "bound" path instance is established by an "outbound" Registration Reply message. The inbound portion of a path instance must exist before the outbound portion can be established. For example, in infrastructure mode, an SCM cannot establish a path instance for a node unless an LCM path instance for the node already exists. If a MN roams, then the most outbound portion of the "old path" is deleted first (i.e. by an inbound Deregistration Reply or Detach Request message). If the link to a child AP or CM link is lost, then all path instances in the sub tree rooted at the AP or CM are deleted.

Each CM or AP maintains a Registration Table that contains a Descendant Registration Record (DRR) for each descendant node (MN, AP, or CM) in its sub tree. A Registration Table can, optionally, include Inbound Registration Records (IRR) for nodes that are not in the sub tree of the respective AP or CM. A temporary Unbound Registration Record (URR) is used to store state information for an unregistered node. Registration Records are updated by Registration, Deregistration, and Detach messages. A Registration Record is aged and discarded if it is not refreshed within a predetermined time. The primary key for a Registration Record is the WLCCP Node ID of the respective node.

An AP or CM maintains additional forwarding and path state information for each descendant WLCCP node. A "Descendant Path Record" (DPR) contains information for sending a message to a descendant node, and other path state information. A DPR can be in a "bound" or "unbound" state. A parent AP creates an unbound DPR and generates an "initial" Registration Request, for a child 802.11 MN, when the MN first enters the 802.11 "associated and authenticated" state. The initial Registration Request also creates an unbound DPR in each AP and CM on the path to the CCM. An "unbound" DPR contains the Message ID of the corresponding initial Registration Request.

A DPR becomes "bound" when an "authenticated" Registration Reply, with a matching Message ID and good status, is received. A "bound" DPR contains a non-zero Path ID, which is set by the parent CM in the Registration Reply.

A path is "bound" if each DPR on the path is in a "bound" state. The path to a node may be both bound and unbound. For example, the most outbound fragment of the path to a MN will be unbound (i.e. until recovery is initiated) if an initial Registration Reply message is lost. Unbound DPRs are quickly aged and discarded; therefore it is not necessary to explicitly delete an "unbound path".

The maximum age of a bound DPR is a predetermined time established during WLCCP registration. Parent APs and CMs age DPRs for child nodes. A DPR is discarded if it is not "refreshed" within the predetermined time. The DPR for a child MN is refreshed by uplink data or management frames. The DPR for a child AP or CM is refreshed by periodic update Registration Requests. If the DPR for a child AP or CM is deleted, then the AP or CM is deregistered and the entire sub tree rooted at the child AP or CM is also deleted.

The CCM has a DRR/DPR for each active CM, AP, or MN in the SWAN campus network. An SCM has a DPR for each AP and MN in its subnet. An SCM DPR the Node ID of the parent AP, if it exists, and the Node ID of the root AP. In an AP, a MN DPR contains a pointer to a Port Record. For an 802.11 AP, a Port Record contains the 802 "hop address" for 802.11 ports. A non-root AP forwards a message "inbound" by sending the message on its primary port.

A SWAN subnet is an Ethernet LAN. For this example, it is assumed that an underlying IEEE 802.1D Spanning Tree Protocol (STP), or other STP, is used to organize wired Ethernet LAN segments, in each AP subnet, into a loop-free spanning tree topology. WLCCP is generally independent of the underlying STP; therefore, WLCCP is compatible with other STPs, such as the Cisco-proprietary PVST+STP available from Cisco Systems, Inc.

The WLCCP SCM advertisement and registration protocol is used to build a WLCCP spanning tree in each subnet, which may exist on top of any underlying (i.e. 802.1D) spanning tree. The WLCCP spanning tree may extend the underlying 802.1D spanning tree with non-STP links to non-STP wireless "repeater" APs or non-STP 802.11 bridges. An AP (e.g. a root AP, repeater AP, or 802.11 bridge) is an interior node and a MN is a leaf in the WLCCP spanning tree.

A single Primary LAN is at the root of the WLCCP spanning tree in each subnet. Each subnet has a single active SCM. By definition, the Primary LAN is the set of, possibly bridged, wired Ethernet segments directly connected to the SCM. Other secondary wireless Ethernet LANs or "Secondary LANs" are connected to the Primary LAN via wireless 802.11 bridge links. [A Primary or Secondary LAN may contain 802.11 bridges that do not participate in WLCCP. Such non-WLCCP 802.11 bridges are transparent to WLCCP.]

A Subnet Control Domain includes all APs that are in the same subnet as the respective SCM and any client stations that are directly, or indirectly, associated with those APs. For example, it includes any MNs that are associated with those APs, even if a MN is assigned to a different subnet at the network layer via VLAN trunking or MIP tunneling. It also includes any ENs attached to secondary LANs that are bridged to the Primary LAN.

An example WLAN spanning tree 3500, for a single subnet, is shown in FIG. 35. the 802.1D STP links and STP APs are denoted as 3502. Wireless links are shown as dashed lines.

The Primary and Secondary LANs may include multiple Ethernet segments and 802.1D bridges and/or switches. The 802.1D "root bridge" may be contained in either the Primary LAN or a Secondary LAN. A Primary or Secondary Ethernet LAN functions as a logical, transparent link with respect to WLCCP.

The "primary port" in a WLCCP AP is the port that is used to access the Primary LAN. A "root AP" is connected directly to the primary LAN on its Ethernet primary port. A "secondary port" is any logical or physical AP port other than the primary port. A primary or secondary port may be an Ethernet or 802.11 port. A logical 802.11 port exists for each wireless AP-to-AP link. A logical secondary BSS port provides access to 802.11 stations in the local BSS. AP 3508 has an 802.11 primary port and an Ethernet secondary port.

A single "WLCCP designated AP" is responsible for bridging frames to a secondary LAN. The WLCCP designated AP for a secondary Ethernet segment may be different than the 802.1D designated bridge for the same Ethernet segment. For example, in FIG. 35, AP 3508 is the "WLCCP designated AP" for the "secondary LAN". If the 802.1D root bridge is contained in the primary LAN, then AP 3508 is also the 802.1D designated bridge for its Ethernet segment in the secondary LAN. A WLCCP designated AP registers its attached secondary LAN with the SCM to establish forwarding and flooding parameters, for the secondary LAN, on wireless links.

A WLCCP "registration protocol" is used to reliably establish the forwarding path from the Primary LAN to 802.11 stations and select secondary LANs. Therefore it is not necessary to flood unicast frames "outbound" (i.e. from the Primary LAN) to 802.11 stations and select secondary LANs.

The WLCCP registration protocol is also used to forward multicast group membership information to the Primary LAN. Optionally, multicast frames are only forwarded on those secondary ports that are used to access members of the multicast group identified by the respective multicast destination address. Multicast communications between 802.11 stations can, optionally, be prohibited to further restrict multicast flooding.

A "secondary LAN" is relative to each AP. For example, in FIG. 35, the wired LAN labeled "secondary LAN" 3510 is only a secondary LAN from the perspective of AP 3512 and AP 3514. In a single AP, the "Primary LAN" can be considered as that portion of the WLAN spanning tree that is accessed via the AP's primary port, for frame forwarding purposes. For example, AP 3516 forwards a frame to the primary LAN by simply relaying the frame to on its primary port (e.g. to the Ethernet LAN labeled "secondary LAN"). The wireless links to the primary LAN are generally transparent to AP 3516.

The 802.1D STP should be operated on wireless links that are used to bridge wired STP LANs. In FIG. 35, for example, the 802.1D STP should be operated on the wireless links between APs 3512, 3514 and 3508 if the Secondary LAN contains 802.1D bridges/switches. AP 3518 is connected to an STP AP, AP 3520, on a non-STP link.

The WLAN spanning tree can include non-STP wireless links to non-STP wireless repeater APs and "work-group bridges" (WGB). Non-STP repeater APs and WGBs attach to the WLAN spanning tree much like 802.11 MNs.

An "old path" to a node is deleted if 1) the node roams to a new parent AP or CM, 2) the node is "disabled" by a network administrator, or 3) the node becomes physically disconnected from the network. For the first two cases, a CM generates a "Deregistration Request" to delete the old path. For the third case, the parent node generates a "Detach Request" to delete the old path.

A CM "deregisters" any old path instance when a new path instance is established for a node that has roamed, or when a network administrator "disables" a node. A CM sends a Deregistration Request message, with the Response-Req Flag set ON, outbound on the old path to solicit a Deregistration Reply message. The Deregistration Reply is forwarded inbound (with hopwise routing if L2 Path Updates are enabled) until it reaches the Originator. The old path instance is deleted in each node as the inbound Deregistration Reply is received; therefore, the most outbound portion of the old path instance is deleted first.

The CM that is the "nearest common ancestor" is responsible for reliably deregistering a node's old path instance, when the node roams. The nearest common ancestor CM is referred to as the "common CM".

A common CM only deregisters bound path instances for descendant nodes (i.e. path instances where it has a bound DPR). A Deregistration Request and the corresponding Reply contain the Path ID of the old bound path instance. The common CM is always the "Originator" in Deregistration Request/Reply messages.

In a multi-subnet implementation, WLCCP registration can be used to establish the Layer 2 forwarding path between the MN and its primary LAN. A "proxy WLCCP MN", in a parent AP, provides proxy WLCCP registration services for WLCCP-unaware MNs. Each MN is registered with the SCM for the native VLAN of its parent AP, even if the MN belongs to a different VLAN.

A parent AP generates an "initial, authenticated" Registration Request message for a MN, after the MN has successfully authenticated or re-authenticated. The Registration Request for a MN contains the MN's SSID and the default subnet for the MN.

The SCM for each subnet maintains the Mobile IP Registration State for Proxy Mobile IP (MIP) MNs. A "foreign SCM" triggers proxy MIP Registration Requests for a MN when the MN first visits the foreign subnet, and periodically thereafter, to maintain FA/HA mobility bindings for the MN. The SCM cannot trigger MIP registration until complete home subnet bindings (i.e. HA address and MN IP address) are established for the MN in the SCM. A "home SCM" triggers a proxy MIP Deregistration Request for a MN when it first roams back to its home subnet from a foreign subnet.

MIP Registration Request frames must be transmitted to a MIP FA with the source Ethernet address of the respective MN, so that the FA can discover the Ethernet address of the MN. Therefore, a parent AP transmits Proxy MIP Registration Requests, to avoid incorrect "backward learning" in any intermediate transparent bridges or switches. A parent AP generates a MIP registration request when it receives an indication from the SCM.

A "Proxy MIP MN" is a MN that requires proxy MIP services. A Proxy MIP MN is configured with an SSID that has proxy MIP enabled. The SSID of a MN is contained in 802.11 (Re)Association Request messages; therefore the parent AP for a MN can immediately determine if the MN may require proxy MIP services.

An SCM is not in the MIP forwarding path for a proxy-MIP MN on a foreign subnet. IP packets for the MN are forwarded between the home subnet and foreign subnet over a MIP tunnel between the MIP HA and FA. The FA forwards IP frames outbound to the unicast 802 address of the MN. The proxy MIP entity, in the parent AP of the MN, forwards IP frames from the MN, inbound, to the unicast 802 address of the FA (i.e. reverse tunneling) or to the unicast 802 address of the default router (i.e. triangular routing).

An SSID/HA database contains a list of MIP HAs that are accessible for each SSID, which is configured with Proxy MIP enabled, on an AP in the SWAN network. Entries in the SSID/HA database are automatically populated by APs, as will be described herein infra. A MN is not dynamically bound to a home subnet, based on its source IP address, unless it is authorised to use its SSID (i.e. via RADIUS) and a MIP HA for the home subnet is in the list of accessible HAs for the MN's SSID.

Each SSID configured on an AP is either implicitly or explicitly bound to a default VLAN or to a MIPv4-HA/Subnet-mask pair. If a Proxy MIP SSID is bound to a default VLAN, then the AP attempts to automatically discover the HA for that VLAN by monitoring HA advertisements transmitted on the VLAN. An AP also attempts to discover the subnet mask for the VLAN. An AP can discover the subnet mask for each VLAN by broadcasting an ICMP Subnet Mask Request message on the VLAN or by monitoring subnet information in Cisco CDP messages.

An AP that is configured with a Proxy MIP SSID must include a container TLV in its Registration Request messages. The container TLV contains a list of TLVs, where each SSID TLV is followed by 0 or more MIP agent TLVs. Each MIP agent TLV contains the IP address, subnet mask, and capabilities of a HA that is accessible for the respective SSID. The subnet mask field for a HA is set to '0' if it is unknown. The SCM consolidates the list of Proxy MIP SSIDs and HAs from all APs in its domain and forwards the resulting lists of Proxy MIP SSIDs and associated HAs to the CCM. The CCM uses the information to automatically populate the SSID/HA database and the "Home Agent Database" described herein infra.

The CCM maintains a Home Agent Database that contains a list of MIPv4-HA/Subnet-mask pairs. Entries in the list are statically configured and/or automatically populated by APs. The CCM uses the database to determine the MIP HA for a Proxy MIP MN when it receives a Registration Request with the Proxy-MIP Flag set ON and a home subnet TLV. The home subnet TLV contains an IP address, of a Proxy MIP MN, which was discovered by "snooping" the source IP address in packets sent by the MN. The CCM determines the HA for the MN by matching the MN's subnet address to the subnet address of an HA. A "longest matching prefix" search algorithm can be used if some subnet masks are not known.

The "home subnet bindings" for a Proxy MIP MN include the MIP HA address, subnet mask, and IP address for the MN. The HA bindings for a MN can be statically configured or automatically derived, as described above. The CCM maintains the "master copy" of the home subnet bindings for each active Proxy MIP MN. The proxy MIP client entity, in an SCM, must determine the home subnet bindings for a Proxy MIP MN, before it can generate a MIP Registration Request for the MN.

A Proxy-MIP MN is assigned to a home subnet with the following (lowest to highest) prioritized rules:
1) A MN is assigned to the default VLAN or Home Subnet Address configured for its SSID in the parent AP.
2) If an AP discovers an IP address of a Proxy-MIP MN, then the MN is assigned to the home subnet that corresponds to its IP address.
3) The MN is assigned to a statically configured home subnet and MIP HA(s).

A proxy MIP MN with existing MIP home subnet bindings is always bound to its current home subnet—even if the MN is associated with an AP that has a matching SSID that is configured with a VLAN ID or Home Agent Address for a different subnet (see the section entitled "Proxy MIP and VLAN Integration"). Proxy MIP is used to access the home subnet, if the MN is attached to an AP on a foreign subnet (i.e. an AP that is not attached to the home subnet on a LAN link or a VLAN trunk link).

A home subnet TLV is used to establish home subnet bindings for a Proxy MIP MN. The TLV comprises the following fields: a) MIPv4 HA, b) Subnet Mask, and c) MN IP Address. The Subnet Mask and MN IP Address fields can be zero if the values are not known. A MN is not be bound to a home subnet until its IP address is discovered.

MN home subnet assignment proceeds as follows. When a Proxy MIP MN roams to a parent AP, the AP must include a home subnet TLV in the initial Registration Request message for the MN. The home subnet TLV must contain the "default MIP HA" address and the MN's IP address, if it is known. The default MIP HA is the either a) the HA that is configured for the Proxy MIP MN's SSID or b) it is the HA that is bound to the VLAN that is configured for the Proxy MIP MN's SSID. The default MIP HA address is used to dynamically establish the home subnet for a MN that does not have existing home subnet bindings. The initial Registration Request is forwarded to the nearest common ancestor CM—the "common CM".

The common CM forwards any existing home subnet bindings for the Proxy MIP MN to the MN's parent AP, in a home subnet TLV in the corresponding Registration Reply message. The outbound Reply message establishes the bindings in each CM and AP on the path to the MN. The existing bindings override the bindings established by the parent AP. Note that the "existing bindings" may have been statically configured or dynamically established (i.e. by an old parent AP).

The CCM is the "common CM" if the Proxy MIP MN does not have existing home subnet bindings. In that case, the HA IP address in the home subnet TLV in the Proxy MIP MN's Registration Request is used to determine the MIP HA for the MN. The home subnet bindings are returned in a home subnet TLV in the Registration Reply generated by the CCM.*

A parent AP may discover that a MN is using an IP address that does not belong to its current home subnet. In that case, the parent AP must immediately generate an update Registration Request, which contains the IP address in a WTLV_HOME_SUBNET TLV, to dynamically assign the MN to the home subnet that corresponds to its IP address.

The CCM uses the SSID/HA database to verify that the MN is permitted to access the home subnet that corresponds to its IP address. If the home subnet assignment is authorised, then the home subnet bindings are contained in a WTLV_HOME_SUBNET TLV in the corresponding Registration Reply generated by the CCM.

An SCM cannot trigger MIP registration until both the MN's IP address and home agent are known. If the MN's IP address is unknown, then the MN's parent AP must immediately generate another Registration Request when it discovers the MN's IP address. A Proxy MN can be assigned to a local VLAN before its IP address is known.

Note that a parent AP consistently assigns a Proxy MIP MN to the home subnet contained in a WTLV_IPV4_HOME_SUBNET TLV in a Registration Reply message for the MN. A Proxy MIP MN is "at home" if the HA address in the Registration Reply message matches a HA address in the AP's VLAN Table. In that case, the MN is assigned to the corresponding VLAN ID in the matching table entry. The parent AP generates a MIP Deregistration Request message for a MN if it receives a Registration Reply, with a WTLV_MIP4_REG_REQ TLV, and the MN is "at home".

Dynamically-assigned home subnet bindings for a MN are aged and discarded if the MN becomes inactive. Therefore, the home subnet for a Proxy-MIP MN may change (i.e. to a more optimal subnet) after some period of inactivity.

A MN can be bound to a "virtual home subnet" by configuring APs with a Proxy MIP SSID that is bound to the virtual home subnet.

The "IPv4 Subnet Selection Option for DHCP", RFC 3011 [Waters, G., The "IPv4 Subnet Selection Option for DHCP", RFC 3011, November, 2000], is used to maintain the IP address for a DHCP MN on a foreign subnet.

The IP address of each MN, AP, and CM interface is optionally registered with the CCM as soon as it is discovered. IP/802 address pairs are distributed in Registration Reply messages to each AP and CM on the path to a node. The IP/802 address bindings are used to facilitate automatic ARP filtering.

The IP address of each node in the sub tree rooted at a "root AP" is registered with the SWAN infrastructure. The IP address of a MN is transferred to the new parent AP each time the MN roams. If "ARP Translation" is enabled, then an AP must filter broadcast ARP requests that are transmitted on 802.11 secondary ports. An ARP request is discarded if the target IP address does not belong to a node in its sub tree; otherwise, if the target IP address belongs to a node in the sub tree, the broadcast destination MAC address is translated to the node's unicast MAC address. The resulting unicast frame is then forwarded as any other unicast frame.

A RADIUS accounting client in a subnet maintains a single RADIUS accounting session for each MN. A parent AP periodically forwards accounting statistics inbound in an accounting TLV contained in a WLCCP Context Request message. The WLCCP registration protocol is used to transfer the accounting session when a MN roams. Any "residual" accounting statistics are forwarded inbound in Deregistration Reply and Detach Request messages, when a MN roams or becomes disconnected. If a MN roams to a new subnet, either a new accounting session must be started at the new subnet, or the accounting session is transferred from the old subnet to the new subnet via lateral context transfer.

MNs do not directly participate in WLCCP. Instead, MNs can support WLCCP 802.11 elements that convey subnet and path cost information. 802.11 elements enable A MN to select a parent AP that provides the least-cost path to the primary LAN on the MN's home subnet, to quickly determine when it has roamed to a different subnet, to quickly discover a MIP Foreign Agent, to reliably register its IP address and to reliably register its enabled multicast addresses.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An infrastructure node in a hierarchical wireless network, comprising:
   the infrastructure node configured to establish a unique context transfer key for communicating with each ancestor node in the same branch of the hierarchical network as the infrastructure node;
   wherein the infrastructure node is directly coupled to not more than one ancestor node;
   wherein the infrastructure node is further configured to establish a unique context transfer key for communicating with each descendant node coupled to the infrastructure node;
   wherein the infrastructure node is further configured to store a path identification indicative of a path instance for a descendent node;
   wherein the infrastructure node is the top node of a subnet tree, the infrastructure node is further configured to cache context information for a mobile node attached to a descendant node of the subnet tree;
   wherein the infrastructure node is configured to receive a new path identification for a descendent node;
   wherein the infrastructure node is responsive to receiving the new path identification for the descendent node to send a deregistration request to a former ancestor node of the descendant node; and
   wherein the infrastructure node is further responsive to update the path identification stored at the infrastructure node with the new path identification.

2. An infrastructure node according to claim 1, the path identification further comprising a layer 2 forwarding path.

3. An infrastructure node according to claim 1, further comprising the infrastructure node is responsive to send the new path information to the ancestor node coupled to the infrastructure node.

4. An infrastructure node according to claim 1, wherein the infrastructure node is a nearest common ancestor for an old parent node and a new parent node for a roaming descendant node, further comprising:
   the infrastructure node is configured for receiving a registration message from the new parent node; and
   the infrastructure node is responsive to the registration message to send a deregistration request message and a lateral context transfer key to the old parent node.

5. An infrastructure node according to claim 1, further comprising the infrastructure node is responsive to receiving a deregistration request and a lateral context transfer key from a common ancestor node with a new parent node to forward context information to the new parent node using the lateral context transfer key to encrypt the message.

6. An infrastructure node according to claim 5, wherein the context information comprises a base transient key for the roaming descendant node.

7. An infrastructure node according to claim 1, further comprising the infrastructure node is responsive to receiving context information for a roaming descendant node from an old parent node of the roaming descendant to extract a lateral context transfer key using a context transfer key the infrastructure node has established with a common ancestor node to the old parent node.

8. An infrastructure node according to claim 7, further comprising the infrastructure node responsive to extracting the lateral context transfer key to decrypting context information using the lateral context transfer key.

9. An infrastructure node according to claim 8, further comprising the infrastructure node is responsive to identify the roaming descendant node by a media access control address, basic service set identifier, rekey number, and message integrity check provided by the roaming descendant node.

10. An infrastructure node according to claim 7, wherein the context information comprises a base transient key for the roaming descendant node.

11. An infrastructure node according to claim 1, further comprising the infrastructure node responsive to discard bindings for a mobile node after the mobile node becomes inactive.

12. An infrastructure node according to claim 1, further comprising:
the infrastructure node is configured to authenticate with an infrastructure authenticator; and
the infrastructure node is responsive to receive from the infrastructure authenticator the unique context transfer key for communicating with each ancestor node.

13. An infrastructure node according to claim 12, further comprising the infrastructure node is configured to receive from the infrastructure authenticator context transfer keys for each ancestor node to decrypt the context transfer keys using a context transfer key established between the infrastructure node and the infrastructure authenticator.

14. An infrastructure node according to claim 1, further comprising:
the infrastructure node is configured to authenticate with an infrastructure authenticator; and
the infrastructure node is configured to receive from the infrastructure authenticator a context transfer key for a descendant node.

15. An infrastructure node according to claim 14, further comprising the infrastructure node is responsive to receiving from the infrastructure authenticator the context transfer key the descendant node to decrypt the context transfer key using a context transfer key established between the infrastructure node and the infrastructure authenticator.

16. A method for providing secure wireless network communications in a hierarchical wireless network, comprising:
authenticating an infrastructure node with an infrastructure authenticator, wherein the infrastructure node has a plurality of descendant nodes, each node at a different hierarchical level along a path instance;
establishing a context transfer key between the infrastructure node and the infrastructure authenticator;
establishing a context transfer key with an ancestor node on a path from the infrastructure node and the infrastructure authenticator;
sending a deregistration request for a deregistering descendant node of the plurality of descendent nodes along the path instance;
the deregistering descendant node being responsive to deleting the path instance for the deregistering descendant node;
the deregistering descendant node being further responsive to sending a deregistration reply back to the infrastructure node; and
each node of the plurality of descendant nodes in the path instance between the infrastructure node and the deregistering descendant node is responsive to delete the path instance for the deregistering descendant node.

17. A method according to claim 16, wherein the infrastructure node is directly coupled to not more than one ancestor node.

18. A method according to claim 16, wherein the infrastructure node is an originator for a context request to a responder node that is not an ancestor node of the infrastructure, further comprising:
determining a common ancestor node between the originator and the responder;
receiving from the common ancestor node a lateral context transfer key for the responder;
generating a message integrity check using the lateral context transfer key; and
sending a context request to the responder, wherein the context request comprises the message integrity check.

19. A method according to claim 18, wherein the context request further comprises a node identifier of the common ancestor node.

20. A method according to claim 18, further comprises:
receiving a ticket from the common ancestor node that contains the lateral context transfer key;
wherein the context request further comprises the ticket.

21. A method according to claim 20, wherein the ticket is encrypted with a context transfer key established between the originator and the common ancestor node.

22. A method according to claim 16, wherein the infrastructure node is a responder for a context request from an originator that is not an ancestor node of the responder, further comprising:
receiving a context request message from the originator node;
extracting a lateral context key from the context request message using a context transfer key the responder established with the common ancestor node; and
authenticating the message with the lateral context request key.

23. A method according to claim 22, further comprising sending a reply to the context request message, the reply authenticated using the context transfer key the responder established with the common ancestor node.

24. A method for a new access point coupled to a hierarchical wireless local area network to establish a session with a mobile node roaming from an old access point to the new access point, wherein the old access point and the new access point are not on the same branch of the hierarchical network, comprising:
receiving a message from the mobile node indicative of the mobile node roaming to the new access point;
determining a common ancestor node between the new access point and the old access point;

routing a registration request from the new access point to the common ancestor;
receiving a registration reply from the common ancestor to the new access point;
receiving a context message for the mobile node;
determining a timestamp for the context message;
discarding the message responsive to the timestamp for the context message being earlier than a timestamp for a current context for the mobile node; and
updating the context for the mobile node based on the context message responsive to the timestamp for the context message being later than the timestamp for the current context of the mobile node;
wherein there is at least one other context manager on a path between the new access point and the common ancestor node, the method further comprising establishing bindings with the at least one other context manager on the path between the new access point and the common ancestor node.

25. A method according to claim 24, further comprising:
determining an IP address for the mobile node;
determining whether the IP address belongs to a current subnet of the mobile node; and
sending an update registration request containing the IP address of the mobile node to dynamically assign the mobile node to a home subnet corresponding to the IP address of the mobile node.

26. A method according to claim 25, further comprising verifying the mobile node is permitted to access the home subnet corresponding to the IP address of the mobile node.

27. A method according to claim 26, further comprising receiving home subnet bindings from a root node of the hierarchical network responsive to the mobile node being authorized for the home subnet corresponding to the IP address of the mobile node.

28. A method according to claim 24, further comprising routing a deregistration request to the old access point.

29. An apparatus, comprising:
an infrastructure node in a hierarchical wireless network, the infrastructure node configured to establish a unique context transfer key for communicating with each ancestor node in the same branch of the hierarchical network as the infrastructure node;
wherein the infrastructure node is further configured to establish a unique context transfer key for communicating with each descendant node coupled to the infrastructure node;
wherein the infrastructure node is further configured to store a path identification indicative of a path instance for a descendent node;
wherein the infrastructure node is the top node of a subnet tree, the infrastructure node is further configured to cache context information for a mobile node attached to a descendant node of the subnet tree;
wherein the infrastructure node is further configured to ascertain a time stamp for a path update message for the descendant node and to discard the path update message responsive to the time stamp being older than a timestamp for a currently stored path identification for the descendant node; and
wherein the infrastructure node is directly coupled to not more than one ancestor node.

30. The apparatus of claim 29, the path identification further comprising a layer 2 forwarding path.

31. The apparatus of claim 29, wherein the infrastructure node is a nearest common ancestor for an old parent node and a new parent node for a roaming descendant node, further comprising:
the infrastructure node configured for receiving a registration message from the new parent node;
the infrastructure node responsive to the registration message to send a deregistration request message and a lateral context transfer key to the old parent node.

32. The apparatus of claim 29, further comprising the infrastructure node responsive to discard bindings for a mobile node after the mobile node becomes inactive.

33. The apparatus of claim 29, further comprising:
the infrastructure node configured to authenticate with an infrastructure authenticator; and
the infrastructure node responsive to receive from the infrastructure authenticator a context transfer key for a descendant node.

34. The apparatus of claim 33, further comprising the infrastructure node responsive to receive from the infrastructure authenticator the context transfer key the descendant node to decrypt the context transfer key using a context transfer key established between the infrastructure node and the infrastructure authenticator.

35. An apparatus, comprising:
an infrastructure node in a hierarchical wireless network configured to establish a unique context transfer key for communicating with each ancestor node in the same branch of the hierarchical network as the infrastructure node;
wherein the infrastructure node is further configured to store a path identification indicative of a path instance for a descendent node;
wherein the infrastructure node is the nearest common ancestor context manager for an old parent node and a new parent node;
wherein the infrastructure node is responsive to receiving a message from a descendant node that the descendant node has roamed from the old parent node to the new parent node to update the path instance for the descendant node to the new parent node;
wherein the infrastructure node is further responsive to receiving the message from the descendant node that the descendant node has roamed to send a message to deregister the old parent node from the path instance; and
wherein the infrastructure node is further responsive to sending a registration message to the new parent node to register the descendant node with the new parent; and
wherein the infrastructure node is directly coupled to not more than one ancestor node.

36. The apparatus of claim 35, wherein the infrastructure node is further configured to establish a unique context transfer key for communicating with each descendant node coupled to the infrastructure node.

37. The apparatus of claim 35, the path identification further comprising a layer 2 forwarding path.

38. The apparatus of claim 35, wherein the infrastructure node is further configured to ascertain a time stamp for a path update message for the descendant node and to discard the path update message responsive to the time stamp being older than a timestamp for a currently stored path identification for the descendant node.

39. The apparatus of claim 35, wherein the infrastructure node is responsive to the registration message to send a deregistration request message and a lateral context transfer key to the old parent node.

40. The apparatus of claim 35, further comprising the infrastructure node responsive to discard bindings for a mobile node after the mobile node becomes inactive.

41. The apparatus of claim 35, wherein the infrastructure node is further configured to authenticate with an infrastructure authenticator; and wherein the infrastructure node is configured to receive from the infrastructure authenticator the unique context transfer key for communicating with each ancestor node.

42. The apparatus of claim 41, wherein the infrastructure node responsive to receive from the infrastructure authenticator context transfer keys for each ancestor node to decrypt the context transfer keys using a context transfer key established between the infrastructure node and the infrastructure authenticator.

43. The apparatus of claim 35, further comprising:

the infrastructure node configured to authenticate with an infrastructure authenticator; and the infrastructure node responsive to receive from the infrastructure authenticator a context transfer key for a descendant node.

44. An apparatus, comprising:

an infrastructure node in a hierarchical wireless network, the infrastructure node configured to establish a unique context transfer key for communicating with each ancestor node in the same branch of the hierarchical network as the infrastructure node;

wherein the infrastructure node is further configured to establish a unique context transfer key for communicating with each descendant node coupled to the infrastructure node;

wherein the infrastructure node is responsive to receiving context information for a roaming descendant node from an old parent node of the roaming descendant to extract a lateral context transfer key using a context transfer key the infrastructure node has established with a common ancestor node to the old parent node;

wherein the infrastructure node is responsive to extracting the lateral context transfer key to decrypting context information using the lateral context transfer key; and wherein the infrastructure node is further configured to identify the roaming descendant node by a media access control address, basic service set identifier, rekey number, and message integrity check provided by the roaming descendant node;

wherein the infrastructure node is directly coupled to not more than one ancestor node.

45. The apparatus of claim 44, wherein the infrastructure node is further configured to store a path identification indicative of a path instance for a descendent node.

46. An infrastructure node according to claim 44, wherein the infrastructure node is the top node of a subnet tree, the infrastructure node is further configured to cache context information for a mobile node attached to a descendant node of the subnet tree.

47. The apparatus of claim 44, wherein the infrastructure node is configured to receive a new path identification for a descendent node;

wherein the infrastructure node is configured to receiving the new path identification for the descendent node to send a deregistration request to a former ancestor node of the descendant node; and wherein the infrastructure node is further configured to update the path identification stored at the infrastructure node with the new path identification.

48. The apparatus of claim 47, wherein the infrastructure node is further configured to send the new path information to the ancestor node coupled to the infrastructure node.

49. The apparatus of claim 46, further comprising the infrastructure node configured to ascertain a time stamp for a path update message for the descendant node and to discard the path update message responsive to the time stamp being older than a timestamp for a currently stored path identification for the descendant node.

50. The apparatus of claim 45, wherein the infrastructure node is the nearest common ancestor context manager for an old parent node and a new parent node;

wherein the infrastructure node is responsive to receiving a message from a descendant node that the descendant node has roamed from the old parent node to the new parent node to update the path instance for the descendant node to the new parent node;

wherein the infrastructure node is further responsive to receiving the message from the descendant node that the descendant node has roamed to send a message to de-register the old parent node from the path instance; and wherein the infrastructure node is further responsive to sending a registration message to the new parent node to register the descendant node with the new parent.

51. The apparatus of claim 44, wherein the infrastructure node is a nearest common ancestor for an old parent node and a new parent node for a roaming descendant node;

wherein the infrastructure node is configured for receiving a registration message from the new parent node; and wherein the infrastructure node is responsive to the registration message to send a deregistration request message and a lateral context transfer key to the old parent node.

52. The apparatus of claim 44, wherein the infrastructure node is responsive to receiving a deregistration request and a lateral context transfer key from a common ancestor node with a new parent node to forward context information to the new parent node using the lateral context transfer key to encrypt the message.

53. The apparatus of claim 5, wherein the context information comprises a base transient key for the roaming descendant node.

54. The apparatus of claim 44, wherein the infrastructure node is responsive to discard bindings for a mobile node after the mobile node becomes inactive.

55. The apparatus of claim 44, wherein the infrastructure node is configured to authenticate with an infrastructure authenticator; and wherein the infrastructure node is configured to receive from the infrastructure authenticator the unique context transfer key for communicating with each ancestor node.

56. The apparatus of claim 55, wherein the infrastructure node is responsive to receive from the infrastructure authenticator context transfer keys for each ancestor node to decrypt the context transfer keys using a context transfer key established between the infrastructure node and the infrastructure authenticator.

57. The apparatus of claim 44, wherein the infrastructure node is configured to authenticate with an infrastructure authenticator; and wherein the infrastructure node responsive to receive from the infrastructure authenticator a context transfer key for a descendant node.

58. The apparatus of claim 57, wherein the infrastructure node is responsive to receiving from the infrastructure authenticator the context transfer key for the descendant node to decrypt the context transfer key using a context transfer key established between the infrastructure node and the infrastructure authenticator.

59. A method for providing secure wireless network communications in a hierarchical wireless network, comprising:
- authenticating an infrastructure node with an infrastructure authenticator;
- establishing a context transfer key between the infrastructure node and the infrastructure authenticator;
- establishing a context key transfer key with an ancestor node on a path from the infrastructure node and the infrastructure authenticator;
- wherein the infrastructure node is an originator for a context request to a responder node that is not an ancestor node of the infrastructure node;
- determining a common ancestor node between the originator and the responder;
- receiving from the common ancestor node a lateral context key for the responder;
- enerating a message integrity check using the lateral context transfer key;
- sending a context request to the responder, wherein the context request comprises the message integrity check;
- receiving a ticket from the common ancestor node that contains the lateral context transfer key, wherein the context request further comprises the ticket;
- wherein the ticket is encrypted with a context transfer key established between the originator and the common ancestor node.

* * * * *